(12) United States Patent
Kim et al.

(10) Patent No.: US 10,898,875 B2
(45) Date of Patent: Jan. 26, 2021

(54) DIELECTRIC BARRIER DISCHARGE REACTOR FOR CATALYTIC NONTHERMAL PLASMA PRODUCTION OF HYDROGEN FROM METHANE

(71) Applicant: CALIFORNIA INSTITUTE OF TECHNOLOGY, Pasadena, CA (US)

(72) Inventors: Soon Sam Kim, Pasadena, CA (US); Gerald E. Voecks, Pasadena, CA (US); Andras Kuthi, Pasadena, CA (US); Masih Jorat, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 12 days.

(21) Appl. No.: 16/375,468

(22) Filed: Apr. 4, 2019

(65) Prior Publication Data
US 2019/0321799 A1 Oct. 24, 2019

Related U.S. Application Data

(60) Provisional application No. 62/659,465, filed on Apr. 18, 2018.

(51) Int. Cl.
*B01J 19/08* (2006.01)
*H05H 1/24* (2006.01)

(52) U.S. Cl.
CPC .......... *B01J 19/088* (2013.01); *H05H 1/2406* (2013.01); *B01J 2219/0815* (2013.01);
(Continued)

(58) Field of Classification Search
None
See application file for complete search history.

(56) References Cited

U.S. PATENT DOCUMENTS

| | | | |
|---|---|---|---|
| 2007/0045125 A1* | 3/2007 | Hartvigsen | ............... C25B 1/02 205/637 |
| 2013/0319501 A1* | 12/2013 | Hilliard | ............... H01L 31/0525 136/246 |

OTHER PUBLICATIONS

Kim, S.S. et al. "Hydrogen from steam methane reforming by catalytic nonthermal plasma using a dielectric barrier discharge reactor"; AIChE J. (American Institute of Chemical Engineers Journal), 10 pages, Dec. 3, 2019.
(Continued)

*Primary Examiner* — Kishor Mayekar
(74) *Attorney, Agent, or Firm* — Steinfl + Bruno LLP

(57) ABSTRACT

A dielectric barrier discharge reactor for catalytic nonthermal plasma production of hydrogen from methane. The dielectric barrier discharge reactor includes two end pieces connected by a dielectric tube, two steam generators, two catalyst cages, two perforated tube center electrodes, a center electrode rod, a grounding electrode. In one aspect, the end pieces and the dielectric tube are fabricated from ceramic and fused quartz respectively. In another aspect, the dielectric barrier discharge reactor further includes catalyst cages. In yet another aspect, the catalyst cages contain catalysts in form of pellets. In an alternate aspect, the dielectric barrier discharge reactor acts to cause a reaction between incoming reactant gases. The reaction is achieved under a plasma which is generated between the perforated tubular center electrode and the ground electrode. In yet another alternate aspect, the dielectric barrier discharge reactor is used at home to generate hydrogen from methane.

17 Claims, 17 Drawing Sheets

(52) U.S. Cl.
CPC ...... *B01J 2219/0833* (2013.01); *B01J 2219/0841* (2013.01); *B01J 2219/0875* (2013.01); *B01J 2219/0896* (2013.01); *H05H 2001/245* (2013.01); *H05H 2001/2431* (2013.01)

(56) References Cited

OTHER PUBLICATIONS

Lu, Qi et al. "A selective and efficient electrocatalyst for carbon dioxide reduction", in Nature Communications vol. 5, Article number: 3242 (2014), see https://www.nature.com/articles/ncomms4242. 6 pages.

Chen, H.L., et al. "Review of plasma catalysis on hydrocarbon reforming for hydrogen production—Interaction, integration, and prospects," Applied Catalysis B. Environmental, 85, (2008) 1-9.

Ghoneim, SA et al. "Review on innovative catalytic reforming of natural gas to syngas". World Journal of Engineering and Technology. 2016;4:116-139. 24 pages.

Hammer, T., et al. "Plasma catalytic hybrid reforming of methane," Fuel Chemistry Division Preprints, (2002) 47(1), 278-279.

Kogelschatz U. "Industrial innovation based on fundamental physics". Plasma Sources Sci. Technol. 2002;11: A1-A6. 7 pages.

Mahammadunnisa, SK. et al. "Catalytic nonthermal plasma assisted co-processing of methane and nitrous oxide for methanol production" Catalysis Today, 256 (2015) 102-107.

Missen RW et al. "Yield, selectivity, and all that". Chemical Engineering Education 2000; 34: 320-324. 6 pages.

Nozaki T, et al. "Hydrogen enrichment of low-calorific fuels using barrier discharge enhanced Ni/γ-Al2O3 bed reactor: Thermal and nonthermal effect of nonequilibrium plasma". Energy & Fuels. 2006; 20:339-345.

Nozaki, T., et al. "Non-thermal plasma catalysis of methane: Principles, energy efficiency and applications," Catalysis Today, (2013) 211, 29-38.

Ogden JM. "Review of small stationary reformers for hydrogen production". A report for the International Energy Agency, 2001. Agreement on the Production and Utilization of Hydrogen Task 16, Hydrogen from Carbon-Containing Materials. IEA/H2/TR-02/002. 52 pages.

Wang, Q., et al. "Steam enhanced carbon dioxide reforming of methane in DBD plasma reactor," Int J. of Hydrogen Energy, (2011) 36, 8301-8306.

Zhao J, et al. "Scale-up synthesis of hydrogen peroxide from H2/O2 with multiple parallel DBD tubes". Plasma Science and Technology 2009; 11:181-186. 7 pages.

\* cited by examiner

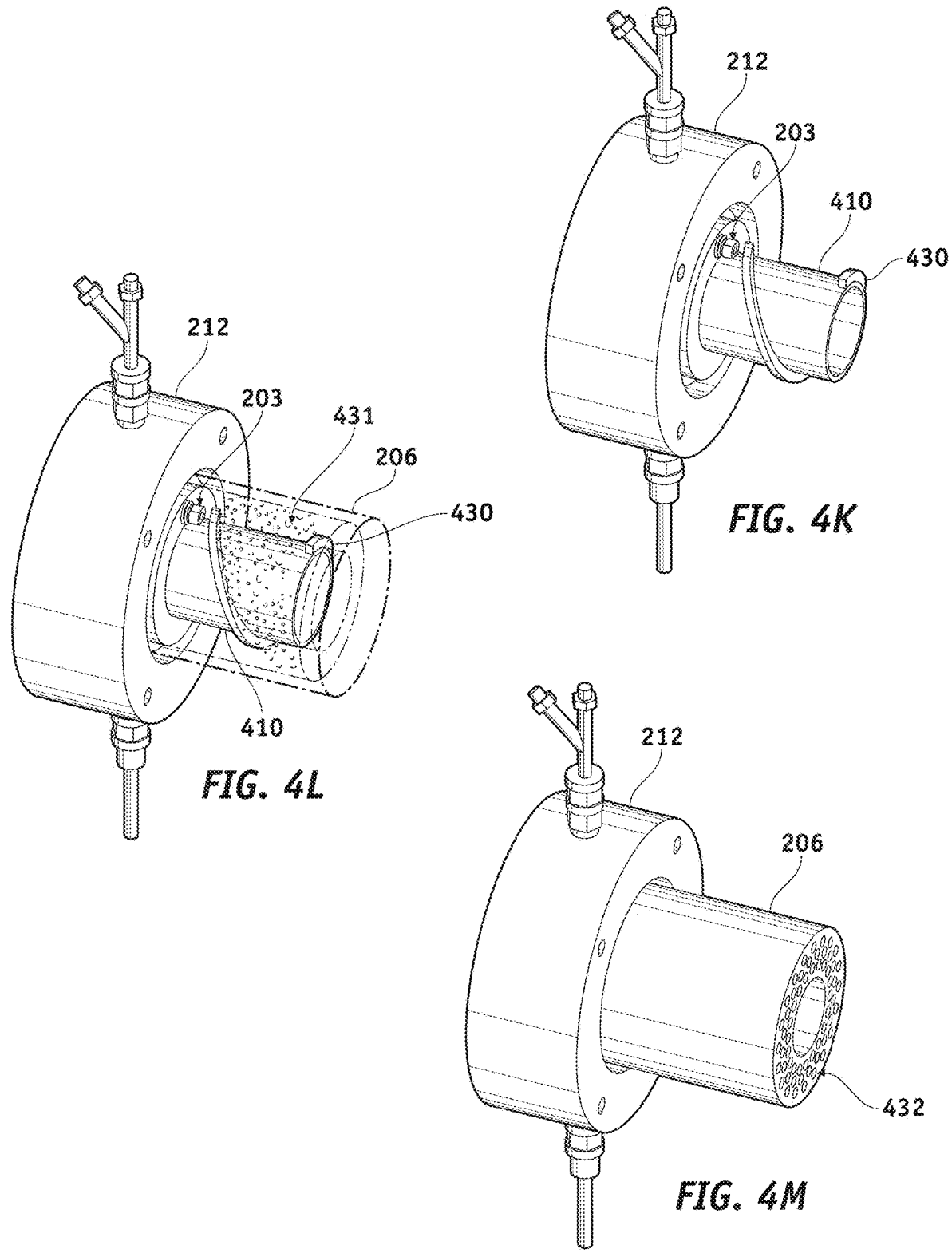

DIELECTRIC BARRIER DISCHARGE REACTOR FOR CATALYTIC NONTHERMAL PLASMA PRODUCTION OF HYDROGEN FROM METHANE

CROSS-REFERENCE TO RELATED APPLICATIONS

The present application claims priority to U.S. Provisional Patent Application No. 62/659,465 filed on Apr. 18, 2018, entitled "Fused Quartz/Ceramic Dielectric Barrier Discharge (DBD) Reactor For Catalytic Nonthermal Plasma (CNTP) Production Of Hydrogen From Methane", the contents of which are herein incorporated by reference in their entirety.

FEDERAL SUPPORT STATEMENT

The invention described herein was made in the performance of work under a NASA contract NNN12AA01C and is subject to the provisions of Public Law 96-517 (35 USC 202) in which the Contractor has elected to retain title.

BACKGROUND

(1) Technical Field

The present teachings generally relate to hydrogen production, and more specifically to reactors that use catalytic nonthermal plasma for the production of hydrogen on non-industrial scale.

(2) Background

Generally, hydrogen has been manufactured from natural gas to serve industrial needs for several decades. The state of art hydrogen production methods using natural gas as raw material include: i) steam reforming, ii) catalytic partial oxidation, and iii) auto-thermal reforming. These methods are suitable mostly for centralized large-scale production of hydrogen. While these centralized model work well for industrial customers, they are highly unsuitable for individual end users and are incompatible for individual transportation purposes, for example, individual fuel cell vehicles.

The practical commercialization of hydrogen fuel cell powered vehicles requires a distributed hydrogen generation infrastructure. Centralized hydrogen production technologies require an extensive distribution network in order to make hydrogen available at various locations. This would be very expensive to establish. High pressure hydrogen storage facilities both at the point of generation and the point of use would have to be built, and transportation networks would have to be established.

An alternative is to produce hydrogen at the point of use, i.e., at a home or at a gasoline filling station. The existence of a large natural gas pipeline structure that serves much of the United States has made it practical to deliver natural gas to many locations distant from the point of production. This already existing natural gas infrastructure could be used most efficiently to produce hydrogen, wherever and whenever it is needed.

Accordingly, there is a need for an apparatus to produce hydrogen at the point of use that will allow for efficient production of hydrogen from the existing natural gas infrastructure.

SUMMARY

Various embodiments of a dielectric barrier discharge reactor for catalytic nonthermal plasma production of hydrogen from methane are disclosed.

In one disclosed embodiment, a dielectric barrier discharge (DBD) reactor is used for catalytic nonthermal plasma production (CNTP) of hydrogen from methane, enabling the production of hydrogen on an as needed basis with a small reactor footprint. The disclosed DBD reactor for CNTP production of hydrogen from methane is advantageous because there is no need for a separate hydrogen distribution infrastructure, since the DBD reactor reforms natural gas as a source material from existing gas pipelines. The DBD reactor for CNTP production of hydrogen from methane is a transformational solution for hydrogen gas utility industry. Furthermore, the disclosed DBD reactor enables the production of hydrogen on an as-needed, on-demand basis.

The DBD reactor for CNTP production of hydrogen from methane includes two separate reaction chambers with catalyst cages. In a CNTP reactor system, a chemical reaction is accomplished within a plasma environment wherein both reactants and catalysts are activated. In the disclosed DBD reactor, the reactant gases and catalysts can be excited through a single plasma generator. The plasma is generated using a center electrode, which is held at a high voltage, and a surrounding electrode, which is grounded.

The center electrode consists of one rod electrode, for example 0.125 inch diameter stainless steel rod, coupled with two perforated tube electrodes, for example 0.970 inch diameter perforated molybdenum tubes, that can furnish plasma to two separate reaction chambers.

Each reaction chamber includes a catalyst cage concentric to a perforated tubular center electrode. This enables the two reaction chambers to be excited simultaneously with a single plasma generator. The perforated tubular center electrode provides a pathway for the exiting gas product. Catalysts, for example in pellet form, are placed in each catalyst cage with two dielectric separators. This arrangement achieves three separate catalyst beds in each catalyst cage. Thus, the use of dielectric separators enables independent reactant gas pathways with the same residence time. This greatly increases the uniformity and efficiency achieved in the disclosed DBD reactor.

Moreover, the design of DBD reactor with right-side and left-side chambers allows for maximum usage of electric power for plasma excitation, because the plasma in both chambers can be excited simultaneously. Furthermore, the design of the DBD reactor with the perforated tubular center electrode concentric to the catalyst cages and a surrounding grounded electrode enables the maximum levels of the plasma to be applied to reactant gases and catalyst cages, while the exiting product gases are shielded from the plasma.

In another embodiment, the DBD reactor for CNTP production of hydrogen from methane includes steam generators. Each steam generator is composed of a spray nozzle, a spiral distributor and a cover. The spiral distributor has a spiral blade with 360° turn which spans over a distance, for example 1.5 inches. The spiral blade's starting height is larger than its ending height. This feature of the spiral blade enables efficient distribution of steam into the reaction chamber. The steam generators are placed at both ends of the DBD reactor. The DBD reactor can be placed in a clamshell heater, whereby the steam generators utilize residual heat from both ends of the clamshell heater. As an example, during the CNTP production of hydrogen from methane, the center portion of the clamshell heater is set at 550° C., whereas the temperature at both ends of the clamshell heater is in the range of 150° C. to 200° C., which is adequate for steam generation.

In yet another alternate embodiment, a dielectric barrier discharge reactor for catalytic nonthermal plasma production of hydrogen from methane is presented, the dielectric barrier discharge reactor comprising a first end piece with a plurality of conduits, a first steam generator connected to the first end piece, a perforated tubular center electrode connected to the first steam generator, and a surrounding ground electrode, wherein the first end piece, the first steam generator, the perforated tubular center electrode and the surrounding ground electrode, in combination, enable catalytic nonthermal plasma production of hydrogen from methane.

BRIEF DESCRIPTION OF THE DRAWINGS

The disclosed apparatus, in accordance with one or more various embodiments, are described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

FIG. 4K shows a diagram of the left-side end piece, a spray nozzle and a spiral distributor. FIG. 4L shows a diagram of the spray nozzle and the spiral distributor, wherein the steam generator cover is drawn in dashed lines. A plastic cover is shown which is used for testing purposes, wherein water droplets around the plastic cover are shown as well. FIG. 4M shows a diagram of the assembled steam generator, including the cover.

Like reference numbers and designations in the various drawings indicate like features.

DETAILED DESCRIPTION

The dielectric barrier discharge (DBD) reactor is used for catalytic nonthermal plasma (CNTP) production of hydrogen from methane, enabling the production of hydrogen on as needed basis with a small physical footprint. The disclosed DBD reactor for CNTP production of hydrogen from methane is advantageous because there is no need for a separate hydrogen distribution infrastructure, since the DBD reactor reforms natural gas as a source material from existing gas pipelines. The DBD reactor for CNTP production of hydrogen from methane is a transformational solution for hydrogen gas utility industry.

Furthermore, the DBD reactor for CNTP production of hydrogen from methane maximizes the efficiency of electrical power usage for plasma generation. The plasma in the DBD reactor efficiently excites both the catalysts and reactant gases without interacting with product gases, which may cause degeneration of the product gases. Moreover, the DBD reactor has uniform plasma over the entire catalyst cages, thus enabling the catalytic nonthermal plasma production process to achieve high conversion efficiency. Uniform plasma enables the excitement of both the catalysts and the reactant gases simultaneously which results in efficient formation of product gases.

Additionally, in the DBD reactor, steam is supplied into the catalyst cages uniformly along with reactant gases which further results in achieving maximum conversion efficiencies. Further, the DBD reactor maximizes the use of thermal energy by utilizing the residual heat from a clamshell heater for steam generation.

The ideal chemical reaction employed in the DBD reactor for CNTP production of hydrogen from methane is given by:

$$CH_4 + H_2O \longrightarrow 3H_2 + CO \quad (1)$$

$$CO + H_2O \longrightarrow CO_2 + H_2 \quad (2)$$

$$CH_4 + 2H_2O \longrightarrow CO_2 + 4H_2 \quad (3)$$

where one mole of methane produces four moles of hydrogen.

However, the actual reactions (1) and (2) are not complete, therefore the product gases contain not only $H_2$ and $CO_2$, but also CO, $CH_4$ and $H_2O$.

The description of figures below provides further details of the DBD reactor for CNTP production of hydrogen from methane.

Figure 1:
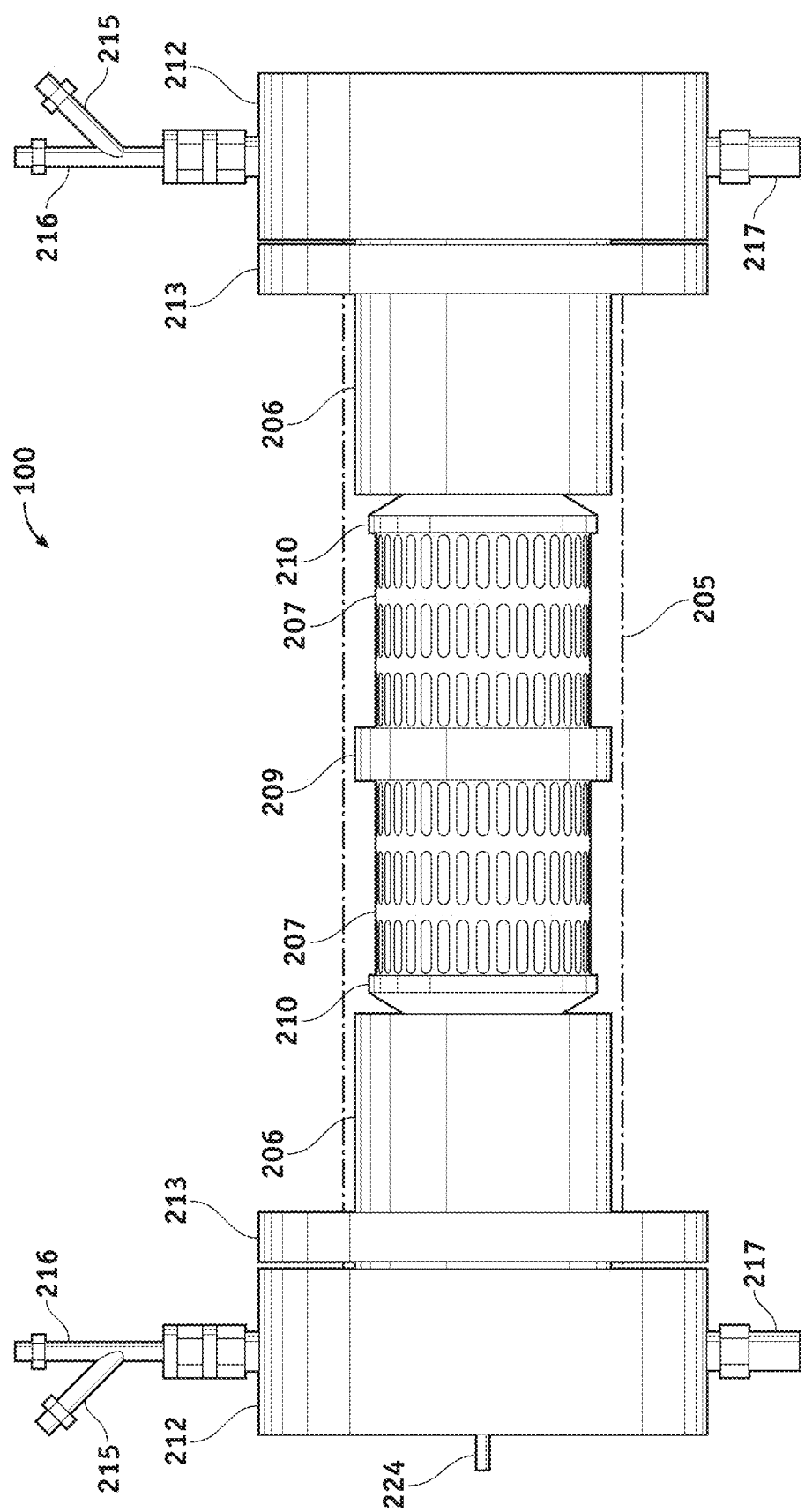
FIG. 1 shows an example of a DBD reactor for CNTP production of hydrogen from methane.

FIG. 1 shows an example of a DBD reactor 100 for CNTP production of hydrogen from methane. The DBD reactor 100 for CNTP production of hydrogen from methane has right-side and left-side reaction chambers, which include the catalyst cages. The reference numbers in FIG. 1 are described in detail in relation to FIGS. 2A-2E.

Figure 2A:
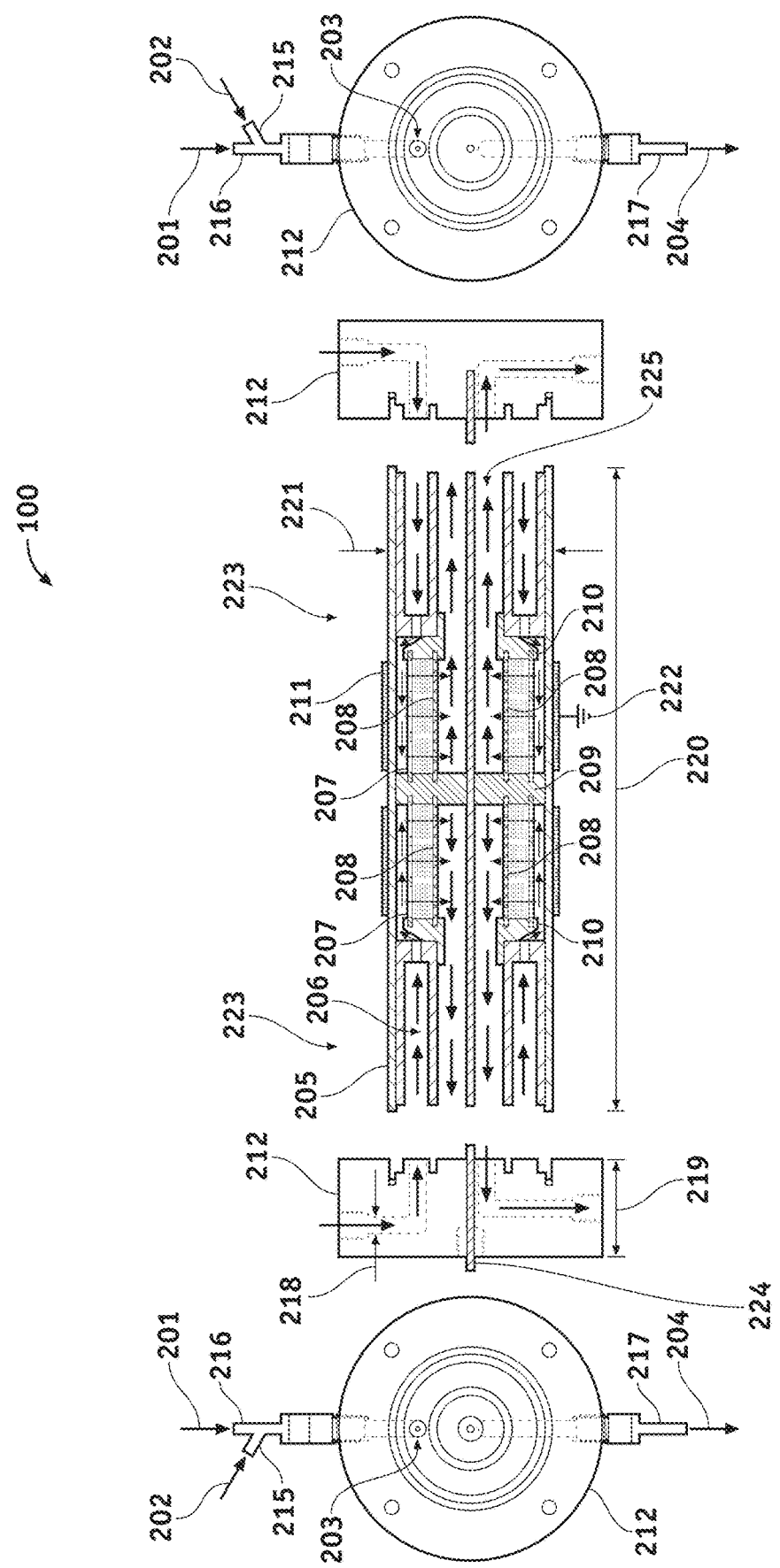
FIG. 2A shows detailed schematic diagrams of the DBD reactor of FIG. 1.

FIG. 2A shows detailed schematic diagrams of the DBD reactor 100, wherein the directions of steam and gas flow are shown. FIG. 2A shows the passages of the reactant and product gases. The reactant gases, for example, include methane and steam, and the product gases, for example, include hydrogen, and small amounts of carbon monoxide, carbon dioxide, methane and water. The DBD reactor has two end pieces 212, one on the left side and another on the right side. End pieces 212 are fabricated out of, for example, MACOR®, which is a machinable glass-ceramic material. MACOR® is a registered trademark of Corning Inc. (Corning, N.Y., U.S.A.). MACOR® is a good thermal insulator and is stable up to temperatures of 1000° C. Each end piece has input pipes 215 and 216 for introduction of methane 202 and water 201, respectively, and pipes 217 for discharge of output gases 204, i.e. hydrogen, carbon monoxide, carbon dioxide, methane and steam.

In FIG. 2A, a side view of each end piece is also shown. Reference 219 shows an example of a size of the end piece 212, for example 1.5 inches. Reference 218 shows a size of a conduit for incoming gases within the end piece 212, for example, 0.375 inches. The left-side and right-side end pieces are symmetrical. Each end piece 212 also includes a spray nozzle 203. Spray nozzle 203 is used to spray reactant gases, i.e. steam and methane, into a reaction chamber 223. A dielectric barrier tube 205 encloses the reaction chambers 223. The dielectric barrier tube 205 can be fabricated out of, for example, fused quartz. The outer diameter of tube 205 can be, for example, 65 mm. A left-side steam generator 206 is shown, wherein incoming water is heated in order to generate steam. Catalyst cages 207 are shown to be positioned between the perforated tubular center electrode 208 and the dielectric barrier tube 205. Catalysts cages are made out of, for example, MACOR®.

In FIG. 2A, the flow of gases are shown by arrows. The arrows show the reactant gases entering the reaction chamber 223, passing through steam generator 206, and then passing over catalyst cages 207, and finally exiting the reaction chamber through 225. The left-side and right-side reaction chambers 223 are separated by a center divider 209. The center divider 209 can be fabricated out of, for example, alumina. The reaction chambers further include end caps 210. The end caps 210 can be fabricated out of, for example, alumina.

In FIG. 2A, references 211 show electrical electrodes which are grounded, and which surround the reaction chambers 223. References 208, together, show a perforated tubular center electrode in the left-side, and a perforated tubular center electrode in the right-side reaction chamber. A center electrode rod 224 spans the DBD reactor and protrudes out of the DBD reactor on the left side. The center electrode rod can be, for example, 0.125 inch stainless steel rod. The perforated tube center electrode is mounted on the center electrode rod through center holes and is concentric with the catalyst cages 207. The perforated tubular center electrode is fabricated out of, for example, molybdenum. The perforated tube center electrode enables generation of uniform plasma over the catalyst cages 207. A uniform plasma results in a uniform reaction of the reactant gases with catalysts. The perforation of the perforated tubular center electrode also facilitates the outward flow of product gases.

In FIG. 2A, ring holders 213 are not shown in the diagram for clarity. Ring holders 213 will be described in detail in FIG. 2D. Reference 220 shows the total length of the left-side and right-side reaction chambers together to be, for example, 11.125 inches. Reference 222 shows the electrical ground connection. Reference 221 shows the size of the outer diameter of a reaction chamber, for example 2.56 inches.

Figure 2B:
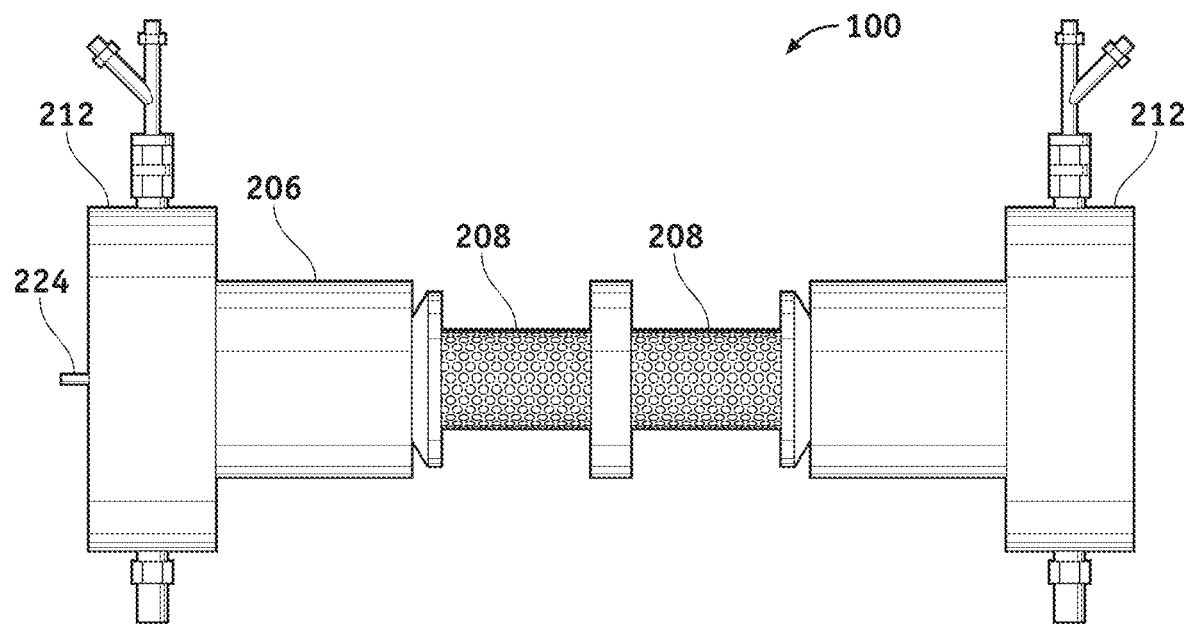
FIG. 2B shows a diagram of the DBD reactor of FIG. 1, wherein two end pieces and a perforated tubular center electrode are shown.

FIG. 2B shows a diagram of the DBD reactor 100, wherein the two end pieces 212 and the perforated tubular center electrode 208 are shown. As also shown in FIG. 1, center electrode rod 224 is also shown, where it protrudes out of the reactor on the left-side.

Figure 2C:
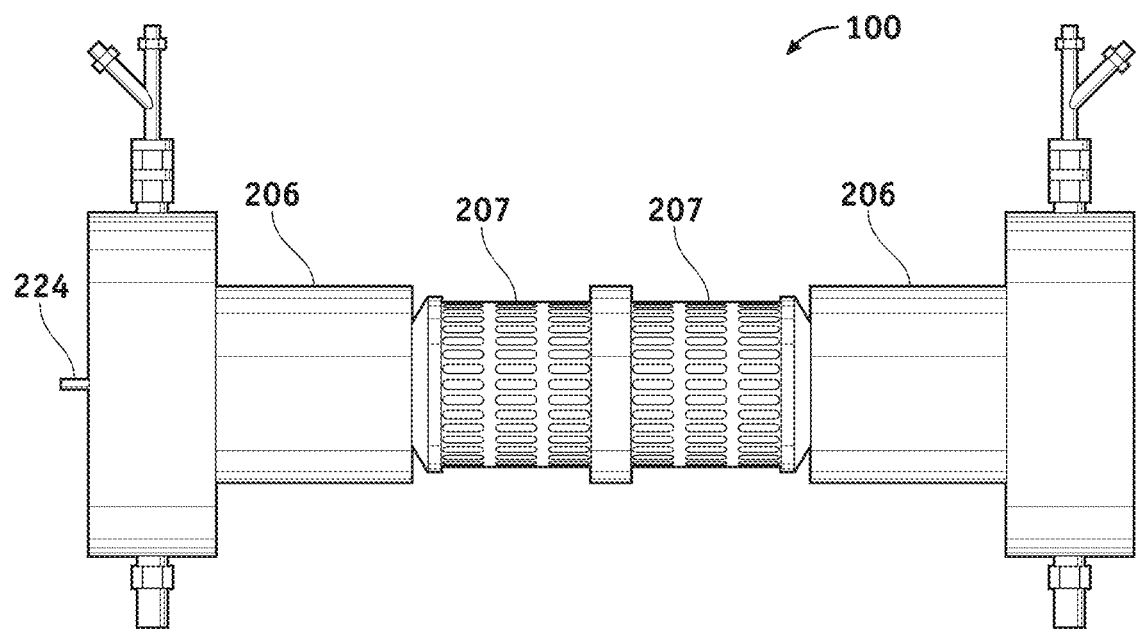
FIG. 2C shows a diagram of the DBD reactor of FIG. 1, wherein two steam generators are shown along with catalyst cages concentric to the center electrode.

FIG. 2C shows a diagram of the DBD reactor 100, wherein left-side and right-side steam generators 206 are shown along with catalyst cages 207 concentric to the center electrode.

Figure 2D:
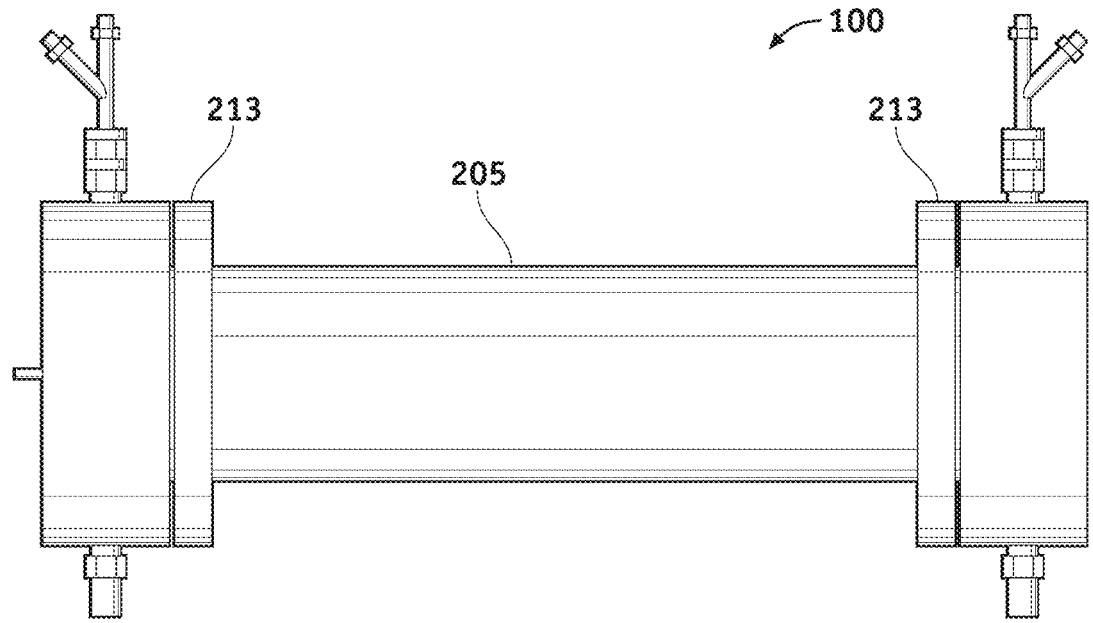
FIG. 2D shows a diagram of the DBD reactor of FIG. 1, wherein a fused quartz dielectric barrier and two ring holders are shown.

FIG. 2D shows a diagram of the assembled DBD reactor 100, wherein a reaction chamber dielectric barrier tube 205 and two ring holders 213 are shown. The reaction chamber dielectric barrier tube 205 is fabricated out of, for example, fused quartz. The ring holders 213 are bonded to the fused quartz tube 205 with high temperature paste, for example, J-B Weld 37901 extreme heat high temperature resistant metallic paste. The fused quartz tube is used as the dielectric barrier, because fused quartz has excellent electrical insulation properties and is resistant to high temperatures.

Figure 2E:
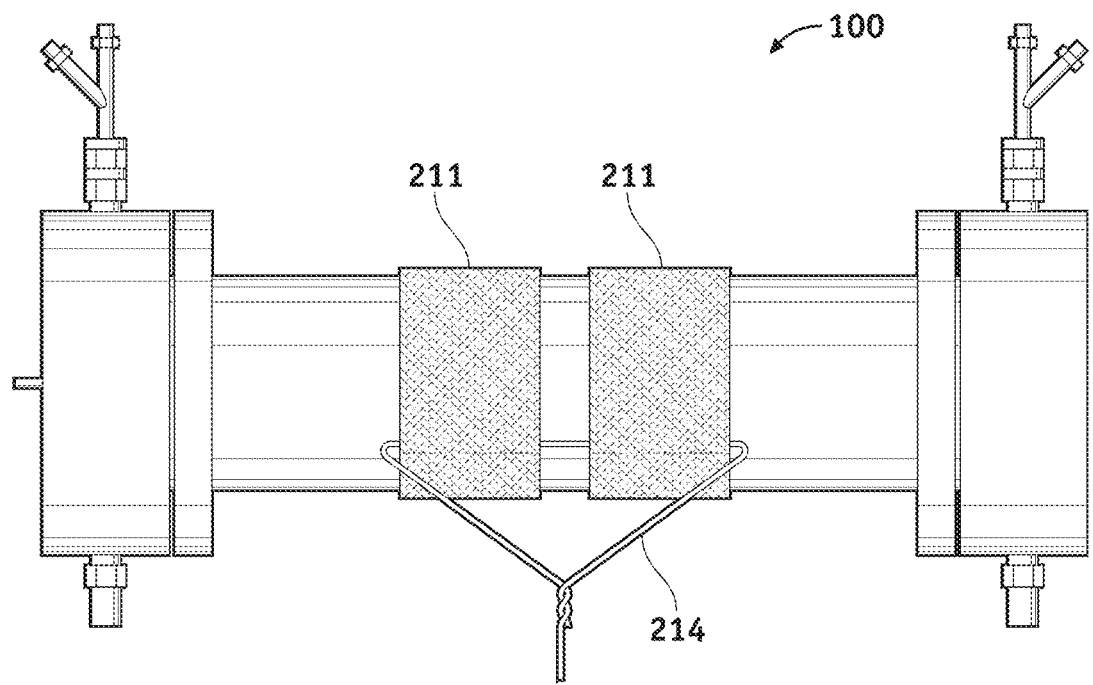
FIG. 2E shows a diagram of the DBD reactor of FIG. 1, wherein a ground electrode is constructed around a fused quartz dielectric barrier using two stainless steel mesh screens which are wrapped around the fused quartz dielectric barrier tubing over a stainless steel wire.

FIG. 2E shows a diagram of the DBD reactor 100, wherein the ground electrode 211 is shown surrounding the fused quartz dielectric barrier tube 205. The ground electrode 211 is made out of, for example, two stainless steel mesh screens, which are wrapped around the fused quartz dielectric barrier tube 205 over a stainless steel wire 214. The size of the wire 214 can be, for example, 0.0625 inches.

The schematic diagrams in FIGS. 2A-2E show the conduits for the reactant and product gases. The reactant gases pass through the catalyst cages between the perforated tube center electrodes 208 and surrounding ground electrode 211. The exiting product gases flow through the inside of perforated tube center electrode 208, where the perforated tubular center electrode forms a Faraday cage. Thus, the product gases are not subjected to high plasma levels and therefore are less prone to subsequent reaction in the gas phase.

Table 1 provides an example of the list of components used in fabrication of the DBD reactor 100:

TABLE 1

| | Material | Dimension |
|---|---|---|
| Dielectric Barrier, 1 ea | Fused quartz tube | 2.56" OD × 2.36" ID × 11.125" long |
| End Pieces (Input/Output), 2 ea | Macor ® discs | 4" Dia × 1.5" thick |
| Ring holder, 2 ea | Macor ® discs | 4" OD × 2.590" ID × ½" thick |
| Steam Generator, 2 ea | Macor ® | Spray Nozzle: 0.316" dia × ½" thick plug with 0.009" hole<br>Spiral distributor: 1.250" OD × 1.125" ID × 2" long cylinder with Spiral on the outside. The spiral has a conic contour, starting at 0.360" height and ends 0.125" height over 1.5" length.<br>Cover tubes: 2.240" OD × 1.0" ID × 3" long cup with ⅛" holes at one end |
| Catalyst Cages, 2 ea<br>Separator Ring, 4 ea | Macor ®,<br>Alumina Rings | Cage: 1.820" OD × 1.695" ID × 1.875" long cylinder, with 3 layers of ⅛" W × 0.458" long slots along the cylinder axis<br>Separator Rings: 1.680" OD × 1.0" ID × 1/16" thick |
| Alumina Caps, 2 ea<br>Alumina Divider, 1 ea | Alumina | Cap: 2.0" OD × 0.740" ID × ¾" thick with groves to mate with center electrode and catalyst cage<br>Divider: 2.185" OD × ½" thick with groves to mate with center electrode and catalyst cage |
| Center Electrode Rod, 1 ea | Stainless steel rod | Rod: ⅛" dia × 16" long |
| Perforated Center electrode, 2 ea | Molybdenum Tubes | Perforated Molybdenum Tubes: 0.970" OD × 2" long with ⅛" holes |
| Ground Electrode Rod, 1 ea<br>Mesh Screen, 2 ea | Stainless Steel | Stainless Steel Mesh: 1" wide × 10' long wrapped around the fused quartz tubing<br>stainless steel rod: 1/16" dia |

Figure 3A:
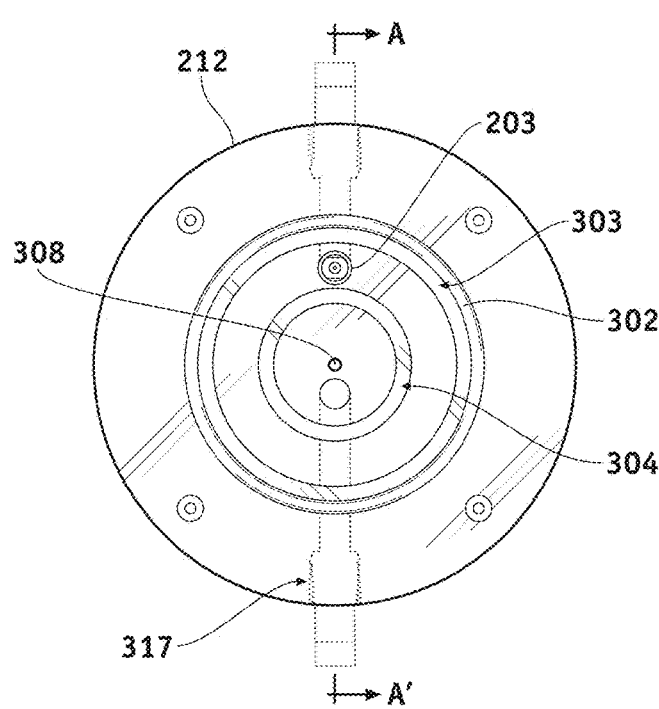
FIGS. 3A-3B show a diagram of the left-side end piece and FIGS. 3C-3D show a diagram of the right-side end piece of the DBD reactor of FIG. 1.
Figure 3B:
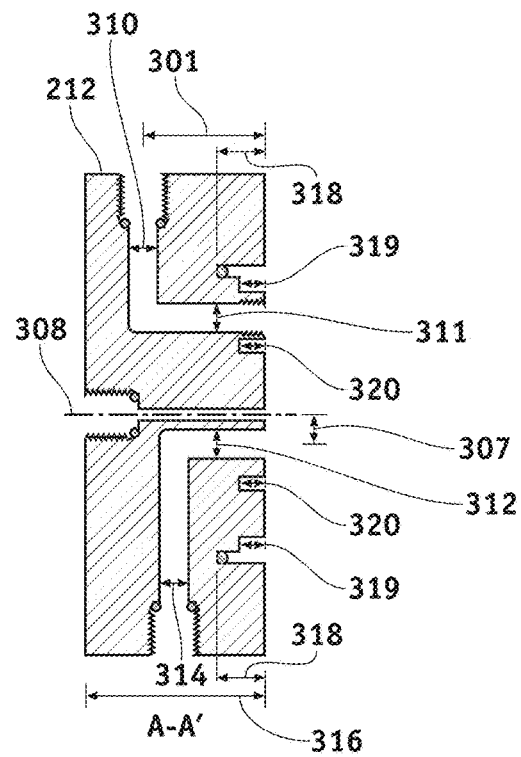
Figure 3C:
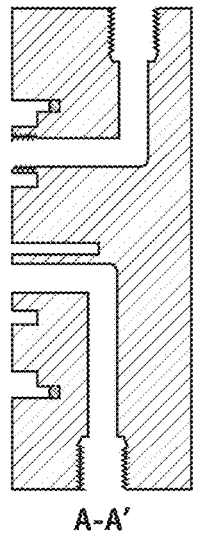
Figure 3D:
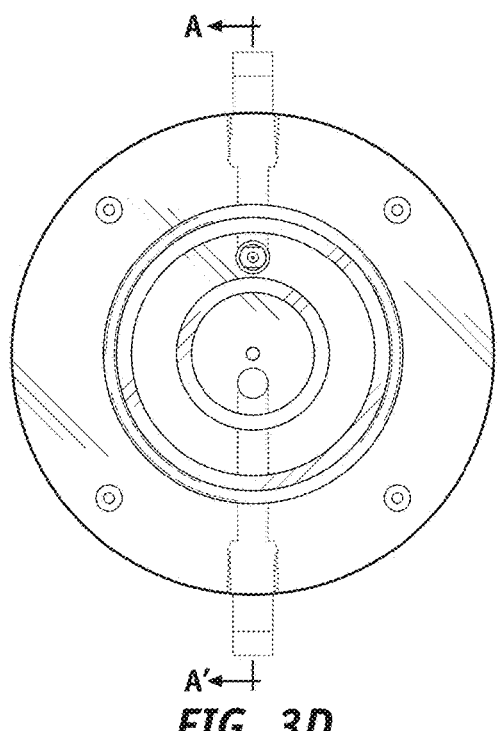

FIGS. 3A-3B show an end-view and a cross-section of the left-side end piece 212 and FIGS. 3C-3D show an end-view and a cross-section of the right-side end piece 212 of the DBD reactor 100. The left-side end piece and the right-side end piece are identical except the right-side has blocked hole 308 whereas the left-side has a through hole 308. A spray nozzle 203 is connected to the end piece 212 by threading the spray nozzle onto the end piece 212. The left-side and right side end pieces include conduits for introduction of reactant gases which are located in the top side of the end pieces, and conduits for discharge of product gases which are located in the bottom side of the end pieces. The end pieces contain ring channels 302, 303 and 304 to mate with the fused quartz tubing 205, via O-ring seals and with steam generator covers. As an example, the size of the fused quartz tubing 205 can be 2.56 inches outer diameter and 2.36 inches inner diameter. The O-ring seals, for example, can be PTFE, No. 228. A threading 317 in the end piece 212 allows for the connection of an outgoing product gas pipe. As an example, the size of reference 317 is 0.25-18 NPT (National Pipe Thread Taper). Table 2 provides some examples of the sizes (in inches) used in fabrication of the fused end pieces 212:

TABLE 2

| Reference No. | Inner Diameter | Outer Diameter/Size |
|---|---|---|
| 301 | — | 1.100 |
| 302 | 2.250 | 2.510 |
| 303 | 1.990 | 2.250 |
| 304 | 0.990 | 1.245 |
| 307 | — | 0.250 |
| 310 | — | 0.250 |
| 311 | — | 0.250 |
| 312 | — | 0.250 |
| 314 | — | 0.200 |
| 316 | — | 1.500 |
| 318 | — | 0.375 |
| 319 | — | 0.125 |
| 320 | — | 0.125 |

Figure 4A:
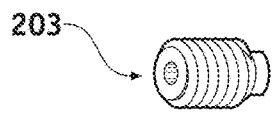
FIGS. 4A-4C show schematic diagrams of a spray nozzle.
Figure 4B:
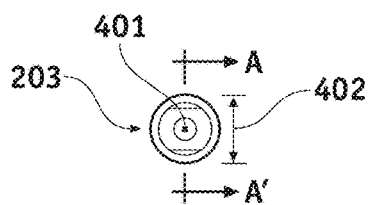
Figure 4C:
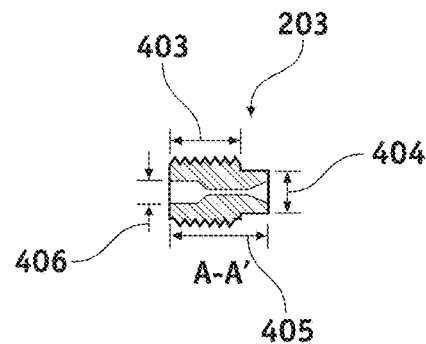

We now describe the steam generators 206. FIGS. 4A-4C show schematic views of the spray nozzle 203. The spray nozzle as shown in FIG. 4A has a tubular shape with a hole in the center. Table 3 provides some examples of the sizes (in inches) used in realization of the spray nozzle 203:

TABLE 3

| Reference No. | Size |
|---|---|
| 401 | 0.009 Diameter hole |
| 402 | 0.316 |
| 403 | 0.375 |
| 404 | 0.1875 |
| 405 | 0.5000 |
| 406 | 0.125 |

Figure 4D:
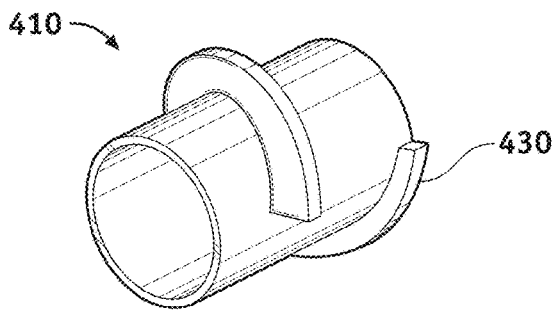
FIGS. 4D-4F show a schematic diagram of a spiral distributor.
Figure 4E:
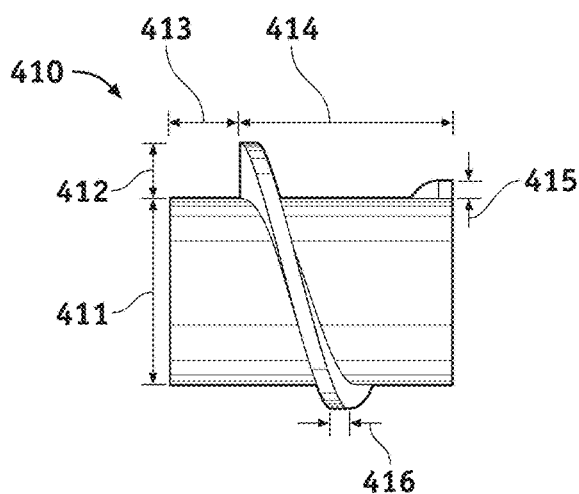
Figure 4F:
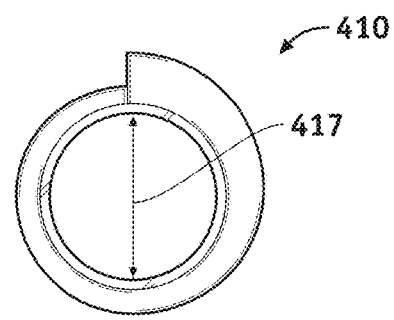

FIGS. 4D-4F show schematic views of a spiral distributor 410. The spiral distributor consists of a cylindrical shape tube with a blade 430 attached to it. Table 4 provides some examples of the sizes (in inches) used in fabrication of the spiral distributor 410:

TABLE 4

| Reference No. | Size |
|---|---|
| 411 | 1.250 |
| 412 | 0.360 |

TABLE 4-continued

| Reference No. | Size |
| --- | --- |
| 413 | 0.500 |
| 414 | 1.500 |
| 415 | 0.125 |
| 416 | 0.125 |
| 417 | 1.125 |

The spiral distributor is used as part of the steam generator, which is illustrated in FIGS. 4K-4M. FIG. 4K shows a diagram of the left-side end piece, with spray nozzle and spiral distributor. FIG. 4L shows a diagram of the spray nozzle and the spiral distributor, wherein the steam generator cover is drawn in dashed lines. Water droplets 431 around the cover are shown as well. FIG. 4M shows a diagram of the assembled steam generator, including the cover 206. As can be seen in FIG. 4E, the spiral distributor 410 has a distributor blade with 360° turn over a distance 414, with the spiral height at the inlet 412 reducing to height 415 at the exit. The spiral blade follows a conical envelope. The height of the spiral distributor 412 at the inlet is larger than its exit height 415. This feature of the spiral blade enables efficient distribution of steam into each reaction chamber 223.

Figure 4I:
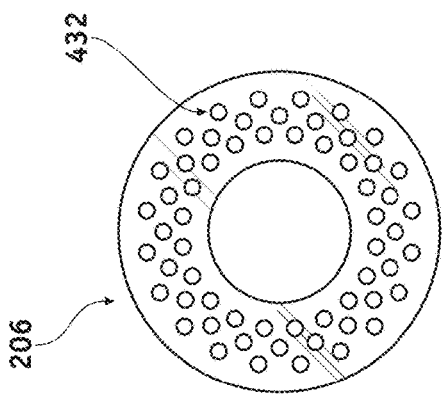
FIG. 4I shows the opposite end of the steam generator, where the steam is distributed out through end holes.
Figure 4H:
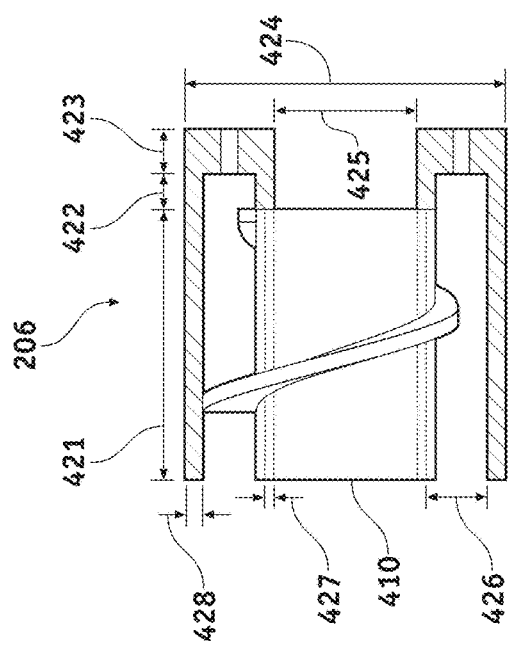
FIG. 4H shows a schematic diagram of a spiral distributor installed inside the steam generator cover.
Figure 4J:
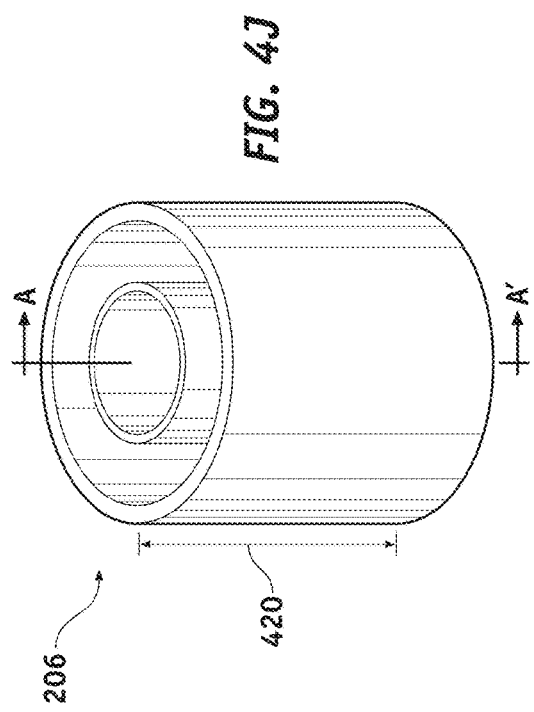
FIG. 4J shows a side view of the steam generator cover.
Figure 4G:
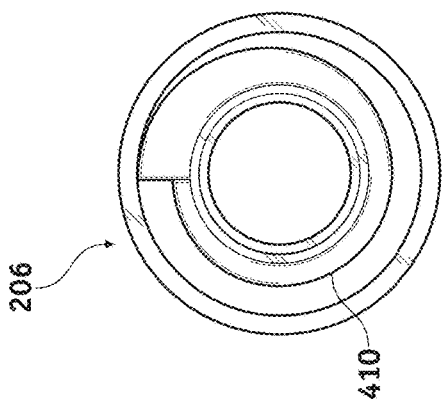
FIG. 4G shows a view of a steam generator that is attached to the left-side end piece of the reactor of FIG. 1.

FIG. 4H shows a schematic diagram of the spiral distributor 430 installed inside the steam generator cover 206. FIGS. 4G and 4I show views of the spiral distributor 410 inserted in the steam generator cover 206. FIG. 4I shows the opposite end of the steam generator, where the steam is distributed out through the holes 432 shown. In this example 3 rows of circular holes are shown at the steam outlet. Steam is uniformly distributed out through these holes. FIG. 4J shows a side view of the steam generator cover 206. Table 5 provides some examples of the sizes (in inches) used in realization of the spiral distributor and steam generator cover:

TABLE 5

| Reference No. | Size |
| --- | --- |
| 420 | 3.000 |
| 421 | 2.000 |
| 422 | 0.750 |
| 423 | 0.250 |
| 424 | 2.240 |
| 425 | 1.000 |
| 426 | 0.375 |
| 427 | 0.4375 |
| 428 | 0.125 |

FIG. 4K shows a diagram of an end piece 212, spray nozzle 203 and the spiral distributor 410. FIG. 4L shows a diagram of the spray nozzle 203 and the spiral distributor 410, wherein the steam generator cover is drawn in dashed lines. The steam generator is composed of a spray nozzle, a spiral and a cover. The spiral is mounted inside the steam generator cover which has, for example, 3 rows of circularly arranged holes. FIG. 4M shows a diagram of the assembled steam generator, including the cover. The steam generator and its parts are fabricated out of, for example, MACOR®.

The steam generators are placed at both ends of the DBD reactor as shown in FIGS. 2A, 2B and 2C. When the DBD reactor is placed in a clamshell heater 700, which is described later in FIGS. 7A-7D, the steam generators utilize residual heat from both ends of the clam shell heater. For example, during CNTP operation, the center portion of the heater is set at 550 whereas the temperature at both ends of the heater is in the range of 150–200° C., which is enough for steam generation and is also safe for the operation of O-ring seals.

Figure 5A:
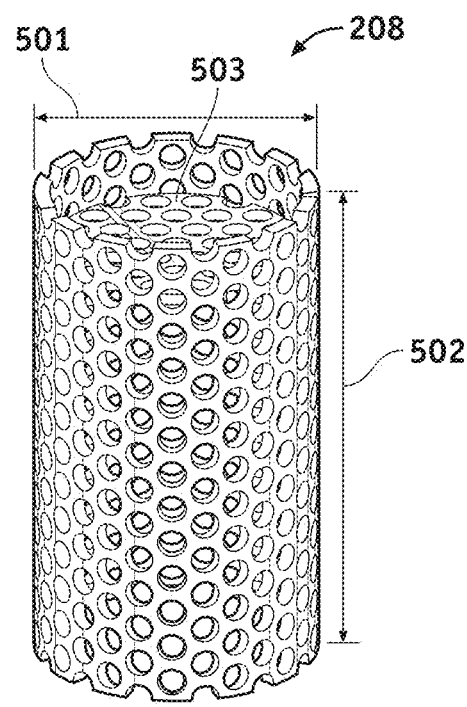
FIG. 5A shows a diagram of the perforated tubular center electrode of FIG. 2B. As depicted, the perforated tubular center electrode has many holes.

We now describe in detail the catalyst cages 207. FIG. 5A shows a diagram of a perforated tube center electrode 208. As depicted, the perforated tube center electrodes have many holes. The perforated tube center electrode includes a perforated end piece 503, which is present at both ends of the perforated tubular center electrode 208. The perforated tube center electrodes are concentric with the catalyst cages 207. The center electrode is fabricated out of, for example, molybdenum tubes. The perforated tube center electrodes enable generation of uniform plasma over the catalyst cages 207. A uniform plasma results in uniform reaction of reactant gases with catalysts. The perforation of the tube center electrodes also facilitates the outward flow of product gases. The holes in the perforate center electrode 208 have a size, for example, of 0.125 inches. In FIG. 5A, reference No. 501 has a size, for example, of 0.970 inches and reference No. 502 has a size of, for example, 2.000 inches.

Figure 5B:
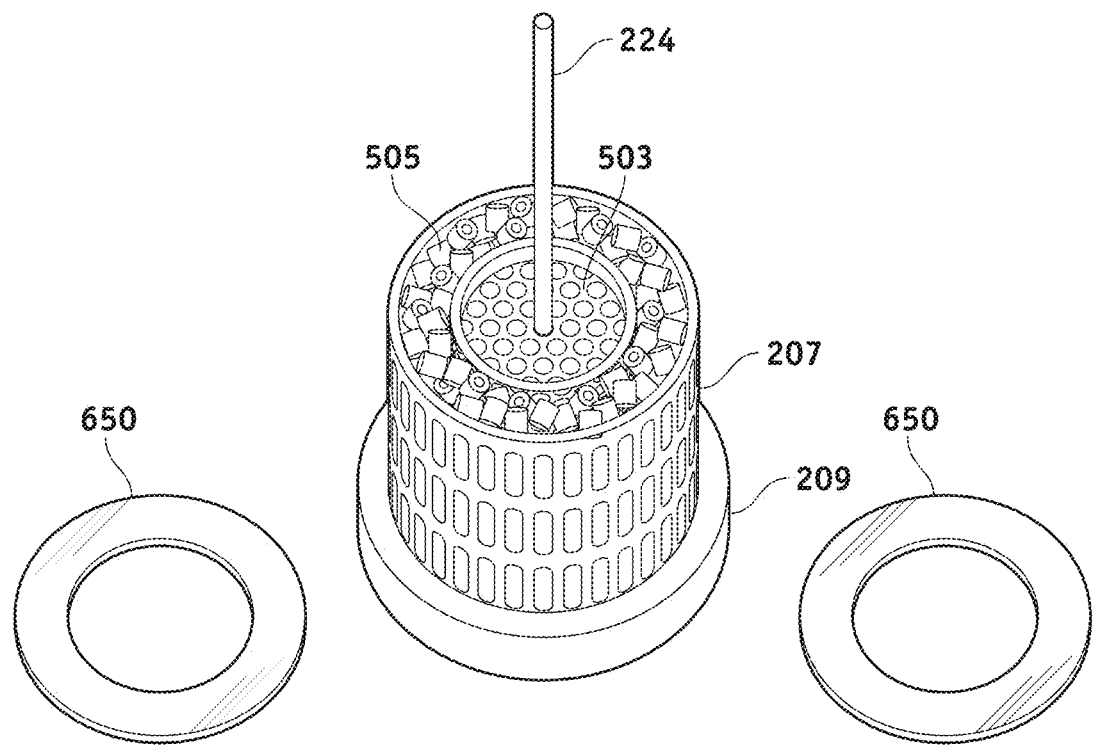
FIG. 5B shows a diagram of a catalyst cage with steam methane reforming (SMR) catalysts. Also shown are two alumina separator rings.

FIG. 5B shows a diagram of a catalyst cage 207, including steam methane reforming (SMR) catalysts 505. Also shown are two alumina separator rings 650. The center electrode rod 224 is also shown, which passes through the perforated end piece 503. The center electrode rod 224 and the perforated end piece 503 have good electrical contact. It should be understood that the alumina separator rings can also be fabricated out of other suitable materials. The catalysts are packed in the annular spaces between the perforated tubular center electrodes and the catalysts cages. The catalyst cages are fabricated out of, for example, MACOR®. There is a catalyst cage in the left-side reaction chamber and a catalyst cage in the right-side reaction chamber. In each cage, catalysts are separated by two alumina separator rings 650 and capped by an end cap 210. This results in three catalyst beds in each cage and provides independent reaction pathways for the reactant gases with the same residence time, for example, 1 second residence time at an input gas flow rate of 1200 ccm for each side of the DBD reactor. The catalysts employed can be, for example, in the form of pellets of Ni/Alumina catalyst. The total weight of the catalyst in the DBD reactor can be, for example, 60 g.

Figure 5C:
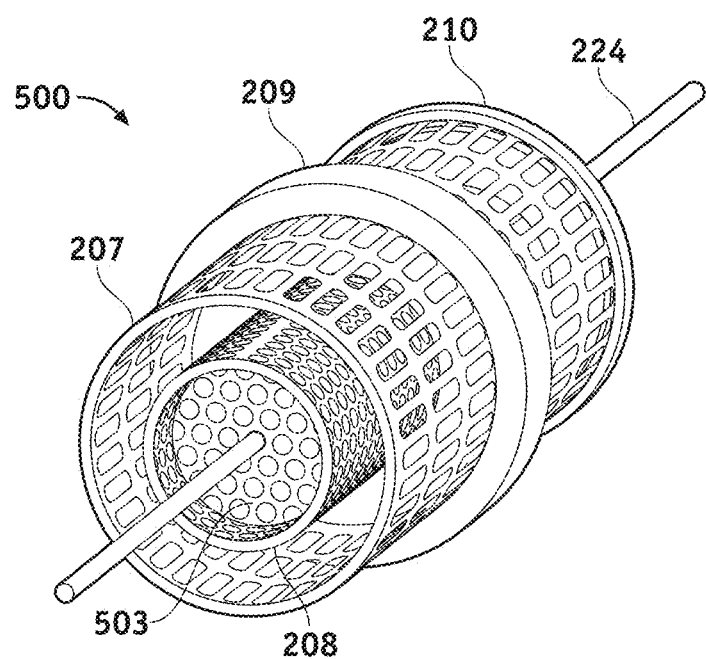
FIG. 5C shows a diagram of an assembly of the center electrode, catalyst cage, an alumina cap, and an alumina center divider.

FIG. 5C shows a diagram of an assembly 500, which includes the catalyst cage, an alumina cap 210, a center divider 209, the perforated tubular center electrode 208 and a center electrode rod 224. The left-side and the right side center electrodes which consists of perforated tubes made out of, for example, molybdenum, are mounted on the center electrode rod 224. The center electrode rod is fabricated out of, for example, stainless steel. The perforated tubular center electrode tubes provide for uniform generation of plasma over the catalyst cages and facilitate the outward flow of product gases. On one hand, the incoming reactant gases and the catalysts are exposed to plasma levels because the plasma is confined in an annular space between the fused quartz tube (dielectric barrier) and the perforated tubular center electrode. On the other hand, this arrangement provides for minimal exposure of product gases to the plasma, since the perforated electrodes act as faraday cages for the product gases.

Figure 5D:
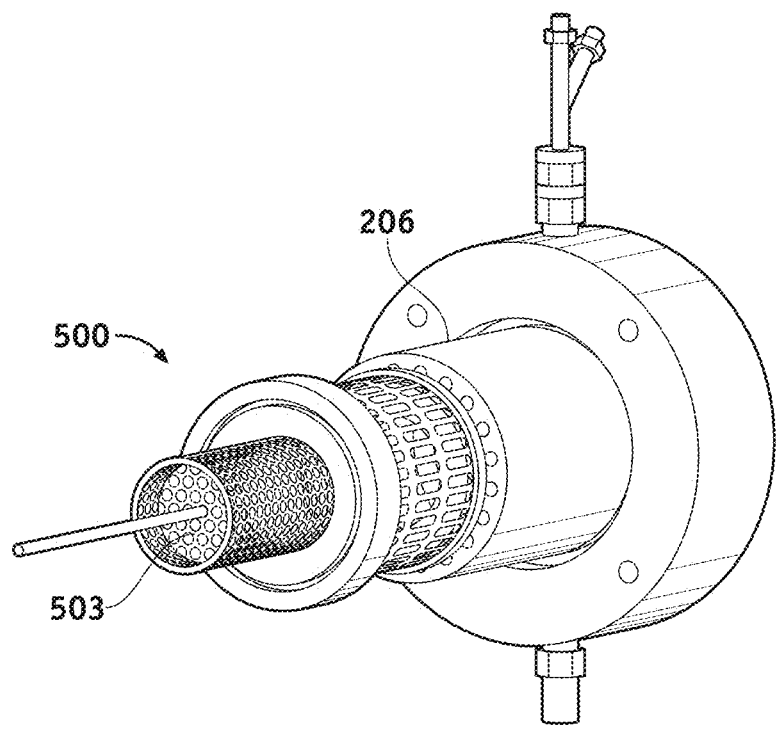
FIG. 5D shows a diagram of the catalyst cage assembly of FIG. 5C, along with the steam generator and an end piece.

FIG. 5D shows a diagram of the assembly 500 of FIG. 5C incorporated with an end piece 212 and a steam generator 206. When high voltage is applied between the center electrode 208 and ground electrode 211 over the catalyst cages 207, the distribution of plasma is strongly dependent on the configuration of the center electrode. The best uniform plasma is achieved with a perforated electrode with concentric catalyst cage as shown in FIGS. 5C-5D.

Figure 6A:
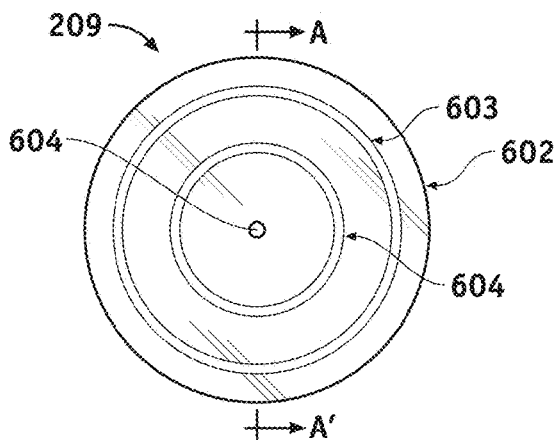
FIGS. 6A and 6B show diagrams for an alumina divider.
Figure 6B:
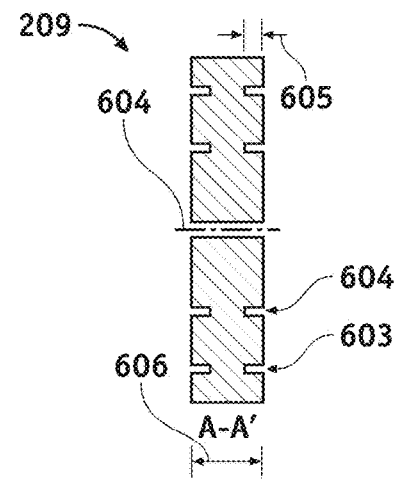
Figure 6C:
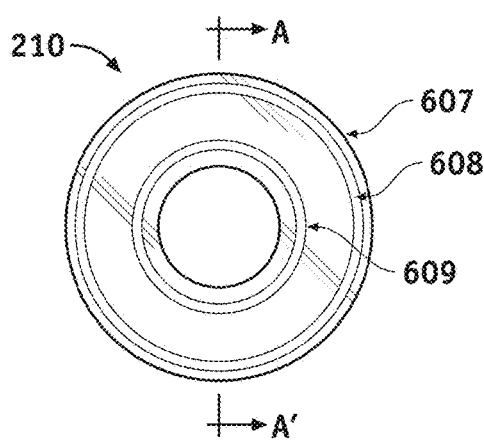
FIGS. 6C and 6D show diagrams for an alumina cap.
Figure 6D:
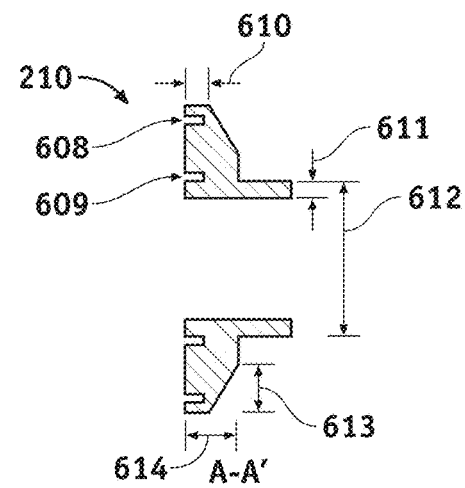
Figure 6E:
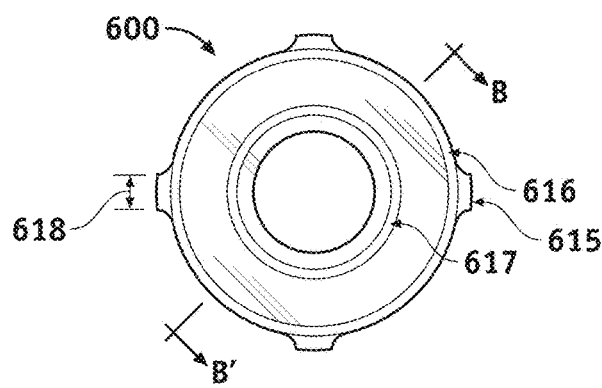
FIGS. 6E and 6F show diagrams for another exemplary embodiment of an alumina cap.
Figure 6F:
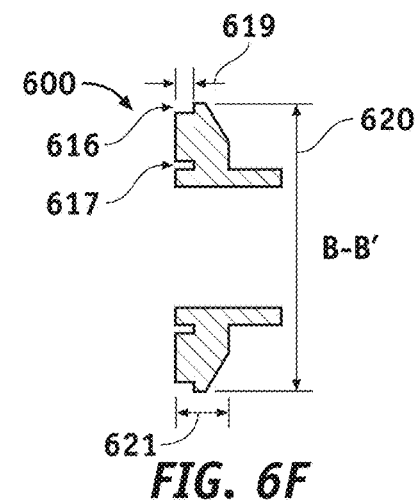
Figure 6G:
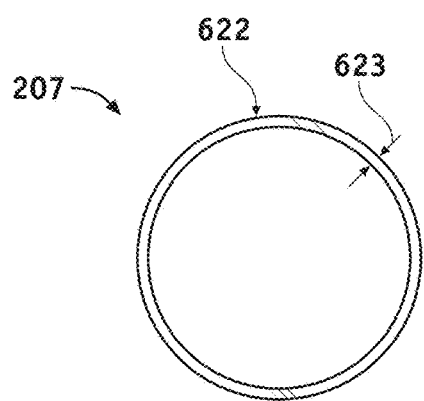
FIGS. 6G and 6H show diagrams for a catalyst cage.
Figure 6H:
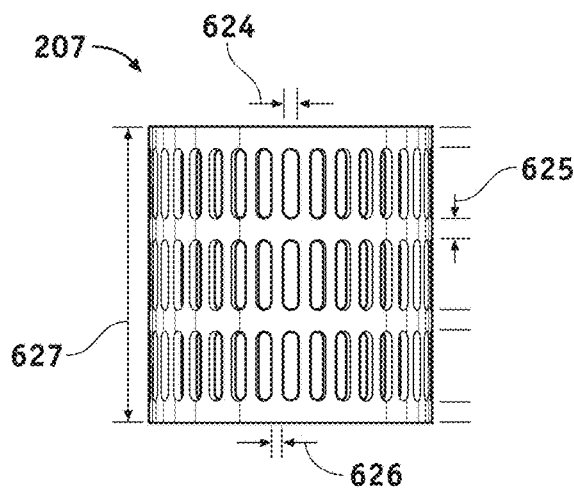
Figure 6I:
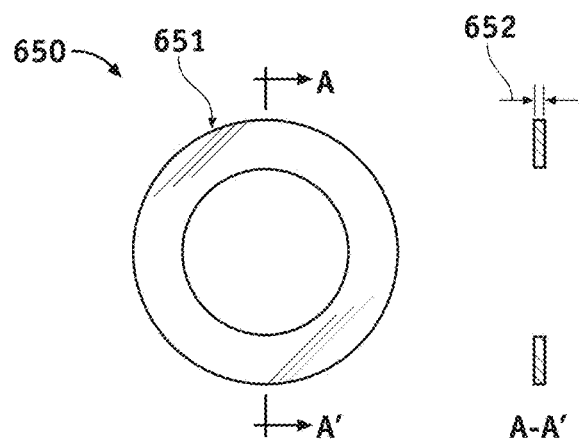
FIG. 6I shows a diagram for an alumina separator ring.

FIGS. 6A-6B show a front view and a cross-section of an alumina divider 209. FIGS. 6C-6D show diagrams for an alumina cap 210. FIGS. 6E-6F show a front view and a cross-section of another exemplary embodiment of an alumina cap 600. FIGS. 6G-6H show diagrams for a catalyst cage. FIG. 6I shows a schematic of an alumina separator ring 650. Table 6 provides some examples of the sizes (in inches) used in the design of an alumina divider, an alumina cap, a catalyst cage divider and an alumina separator ring:

TABLE 6

| Reference No. | Inner Diameter | Outer Diameter/Size |
| --- | --- | --- |
| 602 | — | 2.185 |
| 603 | 1.682 | 1.835 |
| 604 | 0.870 | 1.020 |
| 605 | — | 0.125 |
| 606 | — | 0.500 |
| 607 | — | 2.000 |
| 608 | 1.682 | 1.835 |
| 609 | 0.870 | 1.020 |
| 610 | — | 0.1875 |
| 611 | — | 0.125 |
| 612 | — | 0.990 |
| 613 | — | 0.250 |
| 614 | — | 0.375 |
| 615 | — | 2.000 |
| 616 | 1.682 | 1.835 |
| 617 | 0.870 | 1.020 |
| 618 | — | 0.250 |
| 619 | — | 0.125 |
| 620 | — | 1.835 |
| 621 | — | 0.375 |
| 622 | 1.695 | 1.820 |
| 623 | — | 0.0625 |
| 624 | — | 0.125 |
| 625 | — | 0.125 |
| 626 | — | 0.125 |
| 627 | — | 1.875 |
| 651 | 1.000 | 1.680 |
| 652 | — | 0.0625 |

The alumina cap 600 of FIGS. 6E-6F with notched edges were found to work better for the flow of input gases into the catalyst cages, compared to the alumina cap 210 of FIGS. 6C-6D.

Figure 7A:
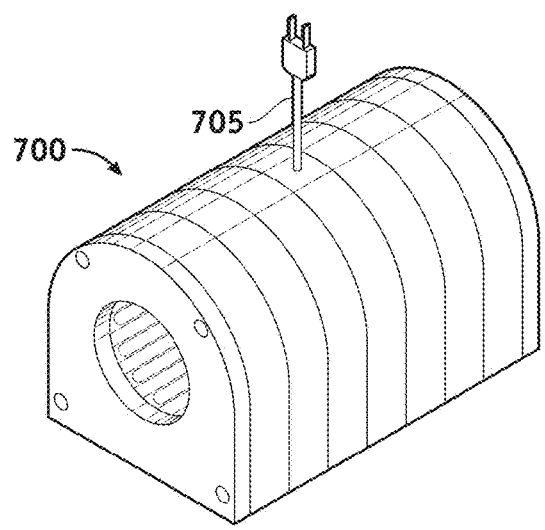
FIGS. 7A-7B show a diagram for a clamshell heater.
Figure 7B:
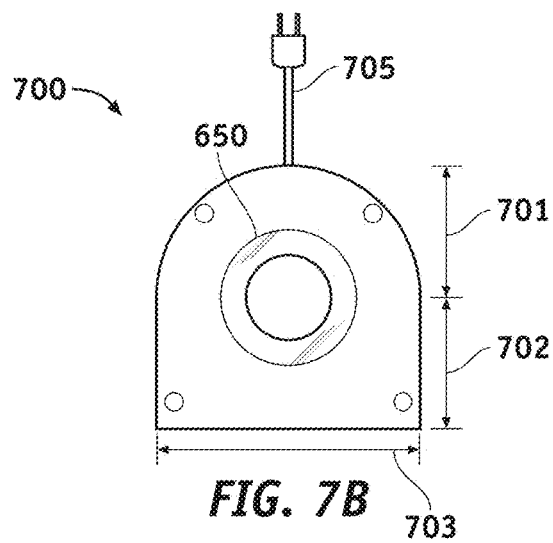
Figure 7C:
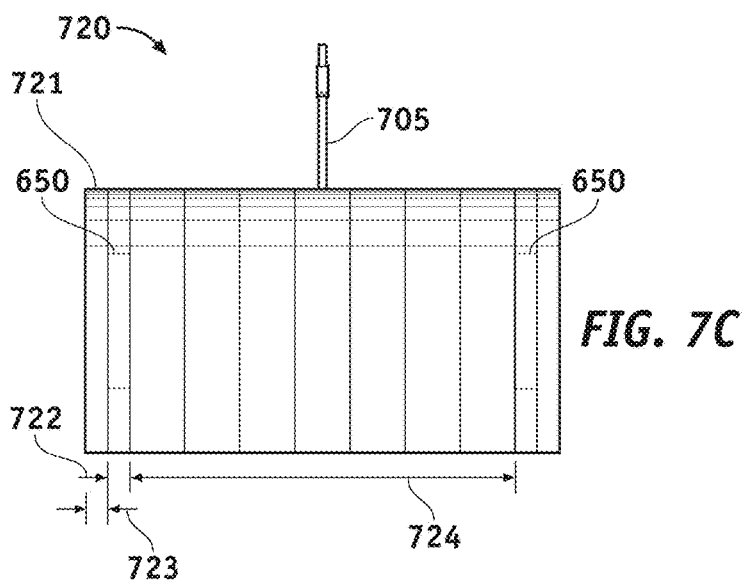
FIG. 7C shows a diagram for a clamshell heater with an insulator.
Figure 7D:
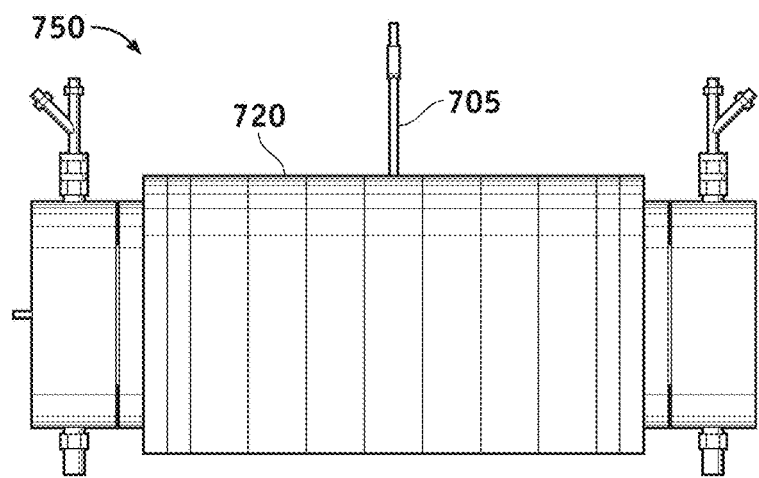
FIG. 7D shows a diagram of the DBD reactor of FIG. 1 which has been enshrouded in the clamshell heater of FIG. 7A.

We now describe a clamshell heater used in heating of the DBD reactor. FIGS. 7A-7B show various views of a clamshell heater 700. FIG. 7C shows a view of the clamshell heater with an insulator assembly 720, where insulator 721 has been added for better heat utilization. FIG. 7D shows an overall view 750, where the DBD reactor 100 has been enshrouded in the clamshell heater and insulator assembly 720. As an example, a clamshell heater from Mellen Co. Inc. (Concord, N.H., U.S.A.) can be used. Table 7 provides some examples of the dimensions (in inches) of the clamshell heater:

TABLE 7

| Reference No. | Size |
| --- | --- |
| 701 | 3.250 |
| 702 | 3.250 |
| 703 | 6.500 |
| 722 | 0.500 |
| 723 | 0.500 |
| 724 | 7.000 |

Clam shell heater 700 includes an electrical cord and thermocouple 705. Ring spacer 650 and insulator 721 end pieces are added to the clamshell heater to better capture the residual heat. Thus, when the DBD reactor is placed inside the clam shell heater, the steam generators, which are located at both ends of the DBD reactor, utilize the residual heat. For example, during CNTP operation, the center portion of the clam shell heater is set at 550° C., whereas the temperature at both ends of the clamshell heater is in the range of 150° C. to 200° C., which is adequate for steam generation and is also safe for the operation of O-ring seals. The clamshell heater described here is an exemplary embodiment of the present disclosure. Another embodiment of the presently claimed subject matter uses an external combustor, as a substitute for the clamshell heater, to provide heat to the DBD reactor.

Figure 8:
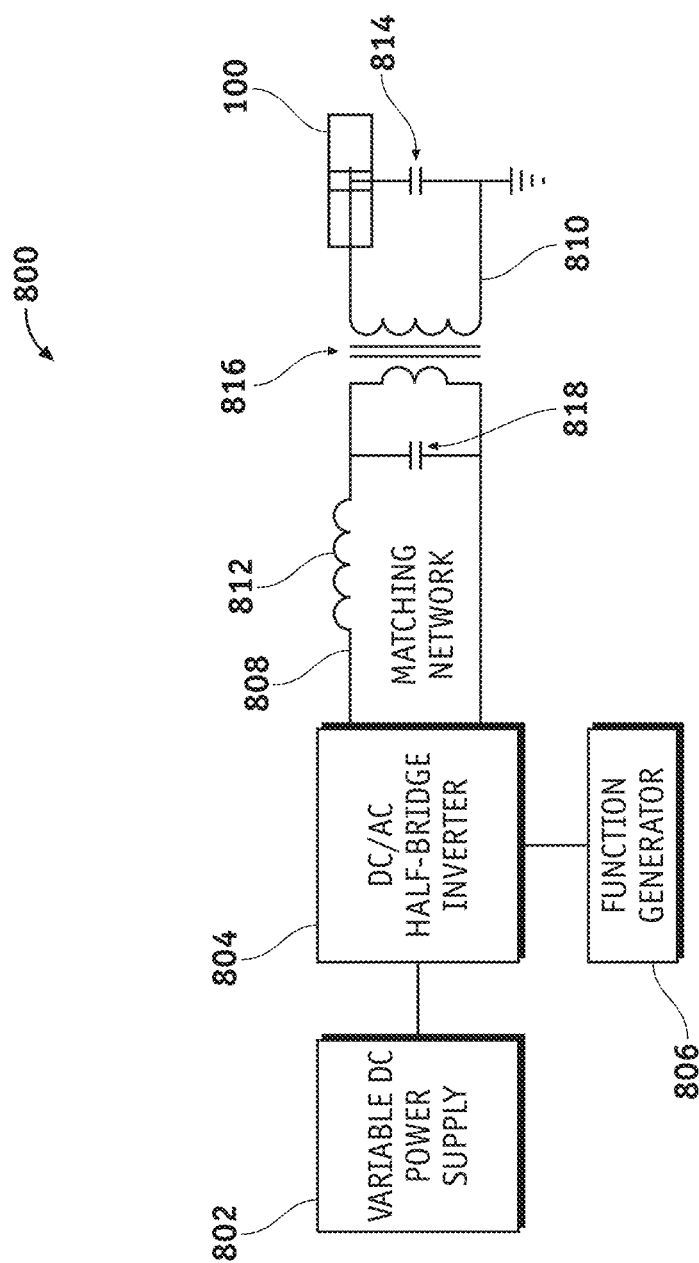
FIG. 8 shows a schematic diagram of an exemplary embodiment of the power supply system for the DBD reactor of FIG. 1.

We now describe the power supply system for the DBD reactor. FIG. 8 shows an electrical schematic diagram of an exemplary embodiment of the power supply system 800 for the DBD reactor 100. The power supply includes a variable DC power supply 802, which is connected to a DC to AC inverter 804. The inverter 804 converts DC voltages into AC voltages by utilizing a function generator 806. The output of the inverter 804, which provides a sinusoidal signal, is connected to an impedance matching network 808, which consists of an inductor 812 and a capacitor 818. The matching network 808 is connected to a high-voltage transformer 816, which receives the sinusoidal output through the matching network and increases the voltage on its secondary side to very high voltage levels. The impedance matching network serves to match the output of the inverter 804 output to the reflected load impedance appearing across the primary side of the transformer 816. The transformer's secondary side voltage finally drives the plasma in the DBD reactor. The DBD reactor is connected to ground terminal 810 by a capacitor 814.

As an example, the voltage generated by the transformer and applied to the DBD reactor can be as high as 20 KV. This high voltage is required for generation of the plasma inside the reaction chamber of the DBD reactor in order to achieve high operation efficiencies.

Figure 9:
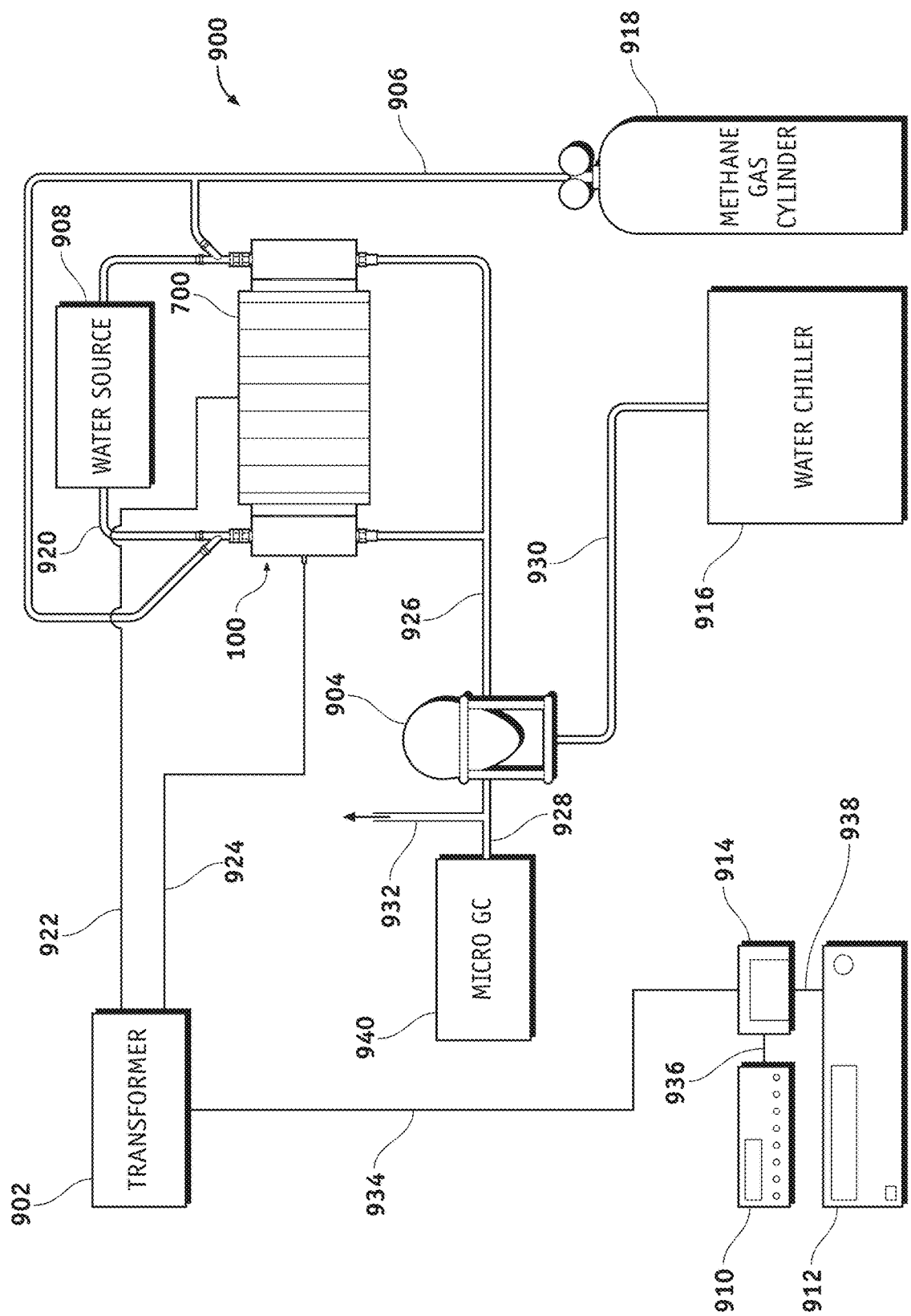
FIG. 9 shows an overall CNTP system configuration, where the DBD reactor of FIG. 1 is shown connected to incoming methane and water lines, the DBD reactor is enshrouded within a clamshell heater, and the output of the DBD reactor is connected to a water trap that is connected to product gas outlet portions of which is sampled by a gas chromatography analyzer.

FIG. 9 shows an exemplary overall CNTP system configuration 900, wherein the DBD reactor 100 is shown connected to incoming methane lines 906, which can be connected to a methane gas tank 918 or home natural gas lines. The DBD reactor 100 is shown connected to water lines 920, which bring water to the DBD reactor from water source 908. The DBD reactor is enshrouded within the clamshell heater 700, and the output of the DBD reactor is connected to a water trap 904 via pipe 926. The water trap 904 removes water from the product gases. The output from water trap 904 is connected to a product output gas stream 932, small portion of which is sampled through 928 by a gas chromatography 940. The gas chromatography 940 analyzes the composition of the output gases. A water chiller 916 provides chilling for water trap 904 via pipes 930. A DC power supply 912, an inverter 914, a waveform generator 910, and transformer 902 provide electrical power for the generation of plasma for the DBD reactor. DC power supply 912 is connected to the inverter 914 by electrical connection 938 and the waveform generator is connected to the inverter 914 by electrical connection 936. The inverter 914 is connected to the inverter transformer 902 by electrical connection 934. The transformer 902 provides high voltage to the reactor by electrical connection 924, which connects to the center electrode rod 224 on the left side of the reactor 100. The transformer 902 also provides ground line 922 to the DBD reactor's ground wire 214.

Figure 10A:
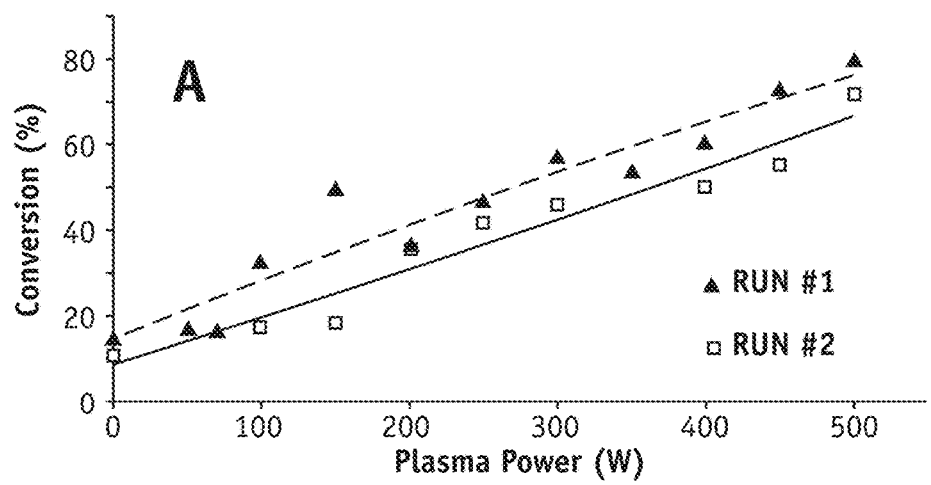
FIG. 10A shows an example of a plot of methane conversion as a function of plasma power.

FIGS. 10A-10F show examples of plots of data from conversion reaction of the DBD reactor. FIG. 10A shows a plot of methane conversion as a function of plasma power. Methane conversation as high as 80% was achieved.

Figure 10B:
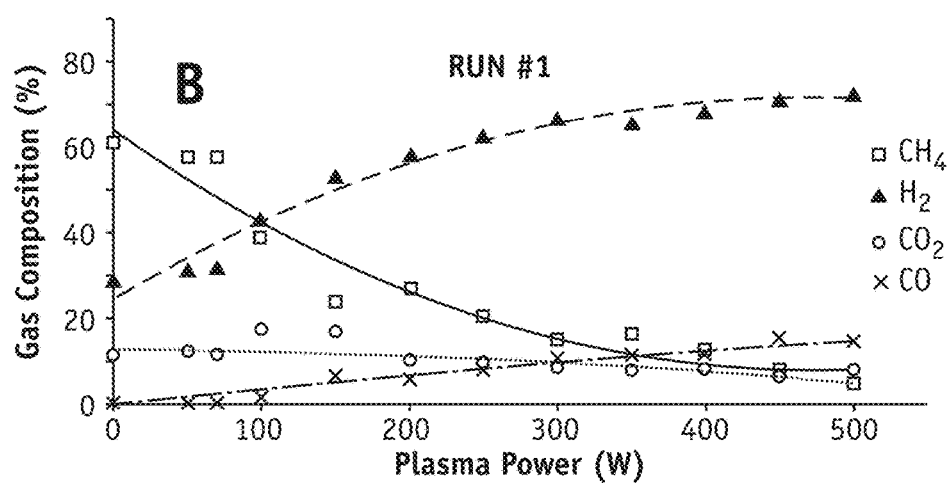
FIG. 10B shows an example of a plot of product gas composition as a function of plasma power that was achieved in a first run of the system.

FIG. 10B shows an example of a plot of product gas composition as a function of plasma power that was achieved in a first run of the system.

Figure 10C:
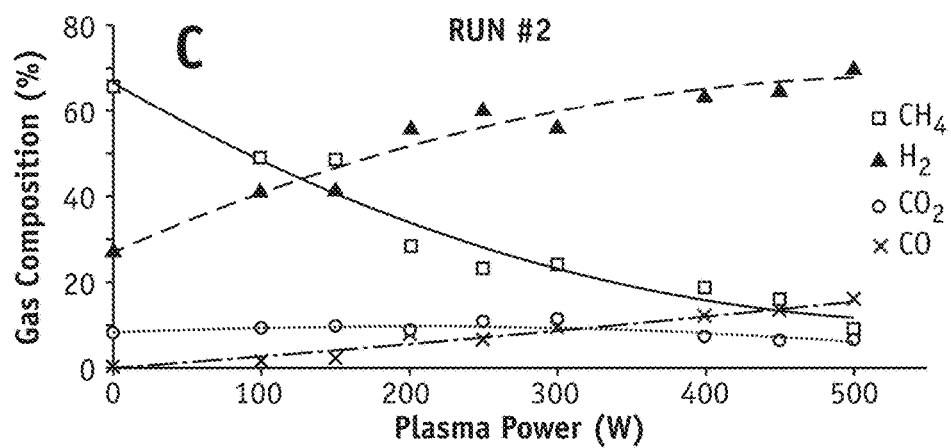
FIG. 10C shows an example of a plot of product gas composition as a function of plasma power that was achieved in a second run of the system.

FIG. 10C shows an example of a plot of product gas composition as a function of plasma power that was achieved in a second run of the system.

Figure 10D:
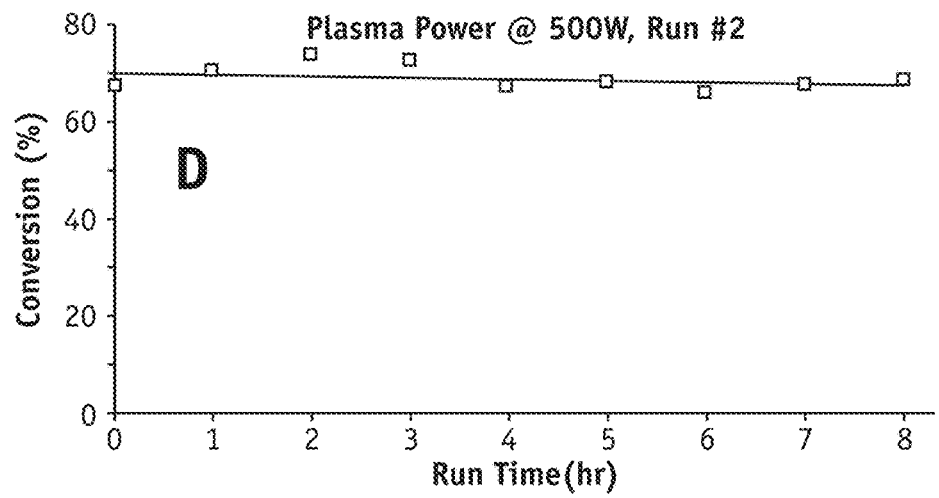
FIG. 10D shows an example of a plot of methane conversion as a function of run time for an eight-hour period at a plasma power level of 500 W.

FIG. 10D shows an example of a plot of methane conversion as a function of run time for an eight-hour period at a plasma power level of 500 W.

Figure 10E:
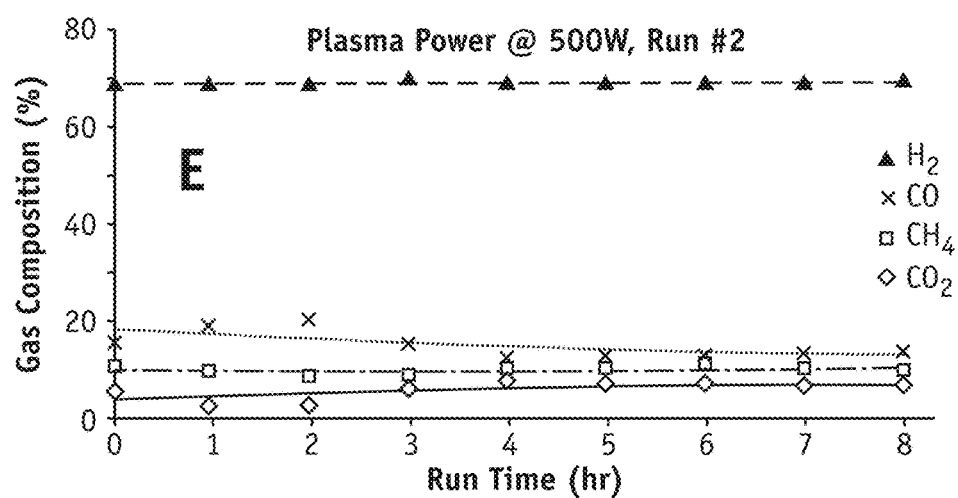
FIG. 10E shows an example of a plot of product gas composition as a function of run time for an eight-hour period at a plasma power level of 500 W.

FIG. 10E shows an example of a plot of product gas composition as a function of run time for an eight-hour period at a plasma power level of 500 W.

Figure 10F:
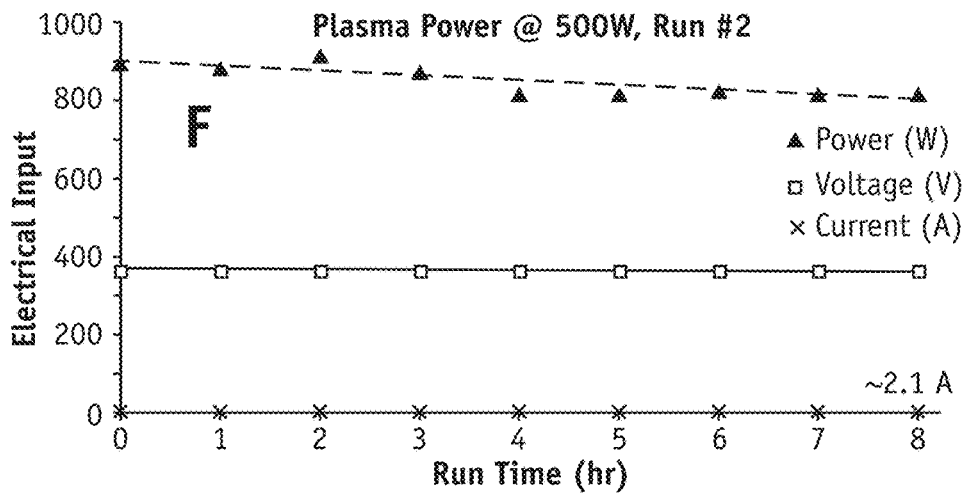
FIG. 10F shows an example of a plot of electrical input power into the DBD reactor as a function of time over an eight-hour period at plasma power of 500 W.

FIG. 10F shows an example of a plot of electrical input power into the DBD reactor as a function of time over an eight-hour period at plasma power of 500 W. The average power consumption is 850 W to produce 500 W plasma power from the DBD reactor. The power efficiency is 60%.

In the above examples, methane conversion efficiencies, for example, of 70% to 80% were achieved at 500 W plasma power. The CNTP conversion was demonstrated, for example, for continuous 8 hour run. Examples of operational parameters are listed in Table 8 and examples of product composition is provided in Table 9:

TABLE 8

| CNTP Reactor System | |
| --- | --- |
| Operation Parameters | Temperature = 550° C., Voltage = 20 kV, Plasma Power = 500 W, Plasma Frequency = 14.2 kHz, Power consumption = 850 W, Power Efficiency = 60% |
| Catalyst Reduction under $H_2$ | 3~3.5 hrs @ 350° C. |
| $CH_4$ input flow rate | 2400 ccm (1200 ccm × 2, 0.1 mole/min) |
| $H_2O$ Flow Rate | 4 ccm (2 ccm × 2) |
| Steam/Carbon Ratio | 3 |
| Residence Time | 1 sec |
| Catalyst | Ni/Alumina SMR Catalyst (Haldor Topsoe), 60 g total |
| $CH_4$ Conversion Efficiency | 70-80% |
| $H_2$ Product Output | 7200 ccm (0.3 mole/min), 0.86 kg $H_2$/24 hr day |
| Continuous Run Demonstration | 8 hrs |

TABLE 9

| | Run #1 | Run #2 | Run #2 (8 hr average) |
| --- | --- | --- | --- |
| $H_2$ | 72.45 | 69.96 | 68.99 |
| $CO_2$ | 7.43 | 6.06 | 6.09 |
| CO | 14.53 | 15.46 | 15.10 |
| $CH_4$ | 5.58 | 8.52 | 9.82 |

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, or parallel fashion.

It is to be understood that the foregoing description is intended to illustrate and not to limit the scope of the invention, which is defined by the scope of the following claims, and that other embodiments are within the scope of the claims.

What is claimed is:

1. A catalytic nonthermal plasma apparatus, comprising:
a first end piece with a plurality of conduits;
a second end piece with a plurality of conduits;
a first steam generator connected to the first end piece;
a second steam generator connected to the second end piece;
a perforated tubular center electrode connected to the first steam generator and to the second steam generator; and
a surrounding ground electrode wrapped around the perforated tubular center electrode and separated by a gap therebetween,
wherein the first end piece, the second end piece, the first steam generator, the second steam generator, the perforated tubular center electrode and the surrounding ground electrode, in combination, enable catalytic nonthermal plasma production of hydrogen from methane.

2. The catalytic nonthermal plasma apparatus of claim 1, further comprising a plurality of catalyst cages.

3. The catalytic nonthermal plasma apparatus of claim 2, wherein the plurality of catalyst cages comprise catalysts.

4. The catalytic nonthermal plasma apparatus of claim 3, wherein the catalysts are in form of pellets.

5. The catalytic nonthermal plasma apparatus of claim 1, further comprising a dielectric barrier tube, wherein the tube connects between the first end piece and the second end piece.

6. The catalytic nonthermal plasma apparatus of claim 5, further comprising a first and second ring holders.

7. The catalytic nonthermal plasma apparatus of claim 6, wherein the first ring holder is connected to the first end piece and the second ring holder connects to the second end piece.

8. The catalytic nonthermal plasma apparatus of claim 7, wherein the first and second end pieces, and the first and second ring holders are all fabricated from ceramic, and wherein the dielectric tube is fabricated from fused quartz.

9. The catalytic nonthermal plasma apparatus of claim 1, wherein the perforated tubular center electrode is fabricated from molybdenum.

10. A method of production of hydrogen from methane, the method comprising:
providing a first end piece with a plurality of conduits;
providing a second end piece with a plurality of conduits;
providing a first steam generator connected to the first end piece;
providing a second steam generator connected to the second end piece;
providing a perforated tubular center electrode connected to the first steam generator and to the second steam generator;
providing a surrounding ground electrode wrapped around the perforated tubular center electrode; and
providing methane and water,
wherein the first end piece, the second end piece, the first steam generator, the second steam generator, the perforated tubular center electrode and the surrounding ground electrode, in combination, act to cause a reaction between the methane and the water and thereby produce hydrogen.

11. The method of production of hydrogen from methane of claim 10, wherein a plasma is produced by the perforated tubular center electrode and the surrounding ground electrode, and wherein the reaction between the methane and the water is assisted by the plasma.

12. The method of production of hydrogen from methane of claim 11, further comprising providing a catalyst, wherein the reaction between the methane and the water is assisted by the catalyst.

13. The method of production of hydrogen from methane of claim 11, further comprising providing a heat source, wherein the reaction between the methane and the water is assisted by the heat from the heat source.

14. The method of claim 10, wherein the perforated tubular center electrode is fabricated from molybdenum.

15. A dielectric barrier discharge reactor, comprising:
a first end piece with a plurality of conduits;
a second end piece with a plurality of conduits;
a first steam generator connected to the first end piece;
a second steam generator connected to the first end piece;
a perforated tubular center electrode connected to the first steam generator and to the second steam generator;
a dielectric barrier tube connected between the first end piece and the second end piece and positioned over the perforated tubular center electrode;
a surrounding ground electrode wrapped around the dielectric barrier tube; and
a clamshell heat source.

16. The dielectric barrier discharge reactor of claim 15, further comprising a plurality of catalyst cages.

17. The dielectric barrier discharge reactor of claim 16, wherein the perforated tubular center electrode and the surrounding grounded electrode are positioned to create a uniform plasma over the plurality of catalyst cages.

* * * * *